US012483867B2

(12) United States Patent
Hwang et al.

(10) Patent No.: US 12,483,867 B2
(45) Date of Patent: Nov. 25, 2025

(54) METHOD BY WHICH V2X VEHICLE TRANSMITS VIRTUAL V2X MESSAGE IN WIRELESS COMMUNICATION SYSTEM SUPPORTING SIDELINK, AND DEVICE THEREFOR

(71) Applicant: LG ELECTRONICS INC., Seoul (KR)

(72) Inventors: Jaeho Hwang, Seoul (KR); Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 621 days.

(21) Appl. No.: 17/759,339

(22) PCT Filed: Jan. 25, 2021

(86) PCT No.: PCT/KR2021/000987
§ 371 (c)(1),
(2) Date: Jul. 22, 2022

(87) PCT Pub. No.: WO2021/150089
PCT Pub. Date: Jul. 29, 2021

(65) Prior Publication Data
US 2023/0073111 A1    Mar. 9, 2023

(30) Foreign Application Priority Data

Jan. 23, 2020  (KR) .................. 10-2020-0009342
Apr. 28, 2020  (KR) .................. 10-2020-0051659

(51) Int. Cl.
*H04W 4/40*    (2018.01)
*G08G 1/16*    (2006.01)
(Continued)

(52) U.S. Cl.
CPC ............. *H04W 4/40* (2018.02); *G08G 1/166* (2013.01); *H04L 51/222* (2022.05); *H04W 4/025* (2013.01); *H04W 92/18* (2013.01)

(58) Field of Classification Search
CPC ....... H04W 4/40; H04W 92/18; H04W 4/025; H04L 51/222; G08G 1/166
See application file for complete search history.

(56) References Cited

U.S. PATENT DOCUMENTS 10,873,840 B1 *  12/2020  Menzel ................ H04L 69/085
2017/0345292 A1 *  11/2017  Haran .................... G08G 1/166
(Continued)

FOREIGN PATENT DOCUMENTS

KR    10-2014-0030691    3/2014
KR    10-2018-0096463    8/2018
(Continued)

OTHER PUBLICATIONS

Korean Intellectual Property Office Application No. 10-2022-7028215, Office Action dated Jan. 29, 2024, 6 pages.
(Continued)

*Primary Examiner* — Kevin C. Harper
*Assistant Examiner* — Salma Ayad
(74) *Attorney, Agent, or Firm* — LEE, HONG, DEGERMAN, KANG & WAIMEY

(57) ABSTRACT

Disclosed are a method by which a V2X vehicle transmits a virtual V2X message in a wireless communication system supporting a sidelink according to various embodiments, and a device therefor, the method comprising: a step for periodically receiving a first message including first vulnerable road user (VRU) information on a first VRU from a network; a step for determining a state of the first VRU on the basis of the first VRU information, and determining whether to convert the first message to the virtual V2X
(Continued)

message on the basis of the state of the first VRU; and a step for transmitting the virtual V2X message including the first VRU information, wherein the V2X vehicle converts the first message into the virtual V2X message when the first VRU state changes from a first state to a second state on the basis of the periodically received first message.

9 Claims, 25 Drawing Sheets

(51) Int. Cl.
  *H04L 51/222* (2022.01)
  *H04W 4/02* (2018.01)
  *H04W 92/18* (2009.01)

(56) References Cited

U.S. PATENT DOCUMENTS

| | | | |
|---|---|---|---|
| 2018/0156624 A1 | 6/2018 | Bai et al. | |
| 2020/0365012 A1* | 11/2020 | Zagajac | G08G 1/096783 |
| 2021/0006955 A1* | 1/2021 | Balasubramanian | H04W 12/02 |
| 2021/0160674 A1* | 5/2021 | Takla | H04W 28/22 |
| 2022/0383750 A1* | 12/2022 | Sharma Banjade | G08G 1/005 |
| 2022/0388505 A1* | 12/2022 | Sharma Banjade | G08G 1/096783 |

FOREIGN PATENT DOCUMENTS

| | | |
|---|---|---|
| KR | 10-2019-0084002 | 7/2019 |
| KR | 10-2019-0098093 | 8/2019 |
| WO | 2017-189035 | 11/2017 |
| WO | 2019-147347 | 8/2019 |

OTHER PUBLICATIONS

PCT International Application No. PCT/KR2021/000987, International Search Report dated Apr. 20, 2021, 3 pages.

* cited by examiner (a)

(b)

(a)

(b)

(a)

(b)

METHOD BY WHICH V2X VEHICLE TRANSMITS VIRTUAL V2X MESSAGE IN WIRELESS COMMUNICATION SYSTEM SUPPORTING SIDELINK, AND DEVICE THEREFOR

CROSS-REFERENCE TO RELATED APPLICATIONS

This application is the National Stage filing under 35 U.S.C. 371 of International Application No. PCT/KR2021/000987, filed on Jan. 25, 2021, which claims the benefit of earlier filing date and right of priority to Korean Application Nos. 10-2020-0009342, filed on Jan. 23, 2020, and 10-2020-0051659, filed on Apr. 28, 2020, the contents of which are all hereby incorporated by reference herein in their entireties.

TECHNICAL FIELD

The present disclosure relates to a method by which a vehicle-to-everything (V2X) vehicle transmits a V2X message in a wireless communication system supporting sidelink and device therefor and, more particularly, to a method of converting a vulnerable road user (VRU) message received from a network into a virtual V2X message and transmitting the virtual V2X message and device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

The object of the present disclosure is to provide a method and device for implementing an effective autonomous driving system based on complement between soft vehicle-to-everything (V2X) and V2X. Specifically, when a change in the state of a vulnerable road user (VRU) is detected, a VRU message based on soft V2X may be converted into a virtual V2X message and then transmitted, so that surrounding vehicles with no soft V2X modules may be notified the presence of the VRU.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solution

In an aspect of the present disclosure, there is provided a method of transmitting a virtual vehicle-to-everything (V2X) message by a V2X vehicle in a wireless communication system supporting sidelink. The method may include: periodically receiving a first message including first vulnerable road user (VRU) information on a first VRU from a network; determining a state of the first VRU based on the first VRU information; determining whether to convert the first message into the virtual V2X message based on the state of the first VRU; and transmitting the virtual V2X message including the first VRU information. When the state of the first VRU transitions from a first state to a second state, the V2X vehicle may convert the first message into the virtual V2X message based on the periodically received first message.

Alternatively, the first VRU information may further include information on a movement speed of the first VRU. The state of the first VRU may be determined as the first state when a movement speed of the V2X vehicle is higher than or equal to a specific threshold and the movement speed of the first VRU corresponds to the movement speed of the V2X device. The state of the first VRU may be determined as the second state when the movement speed of the V2X vehicle is lower than the specific threshold and the movement speed of the first VRU is higher than or equal to the specific threshold.

Alternatively, the V2X vehicle may determine whether the state of the first VRU is the first state only when location information included in the first VRU information indicates that the first VRU is within a predetermined specific range from the V2X vehicle.

Alternatively, the method may further include receiving a second message including second VRU information on a second VRU from the network. The V2X vehicle may convert the first message and the second message into a single virtual V2X message and transmit the single virtual V2X message when that both the state of the first VRU and a state of the second VRU transition from the first state to the second state.

Alternatively, the single virtual V2X message may include cluster information on a geographic area including location information on the first VRU and location information on the second VRU.

Alternatively, the single virtual V2X message may further include information on a number of VRUs related to the cluster information.

Alternatively, the first message may be a VRU message received from a soft V2X server through a Universal Mobile Telecommunications System (UMTS) air interface (Uu interface).

In another aspect of the present disclosure, there is provided a V2X vehicle configured to transmit a virtual V2X message in a wireless communication system supporting sidelink. The V2X vehicle may include: a radio frequency (RF) transceiver; and a processor connected to the RF transceiver. The processor may be configured to: control the RF transceiver to periodically receive a first message including first VRU information on a first VRU from a network; determine a state of the first VRU based on the first VRU information; determine whether to convert the first message into the virtual V2X message based on the state of the first VRU; and control the RF transceiver to transmit the virtual V2X message including the first VRU information. When the state of the first VRU transitions from a first state to a second state, the processor may be configured to convert the first message into the virtual V2X message based on the periodically received first message.

Alternatively, the first VRU information may further include information on a movement speed of the first VRU. The state of the first VRU may be determined as the first state when a movement speed of the V2X vehicle is higher than or equal to a specific threshold and the movement speed of the first VRU corresponds to the movement speed of the V2X vehicle. The state of the first VRU may be determined as the second state when the movement speed of the V2X vehicle is lower than the specific threshold and the movement speed of the first VRU is higher than or equal to the specific threshold.

Alternatively, the processor may be configured to determine whether the state of the first VRU is the first state only when location information included in the first VRU information indicates that the first VRU is within a predetermined specific range from the V2X vehicle.

Alternatively, the processor may be further configured to control the RF transceiver to receive a second message including second VRU information on a second VRU from the network. The processor may be configured to convert the first message and the second message into a single virtual V2X message and transmit the single virtual V2X message when both the state of the first VRU and a state of the second VRU transition from the first state to the second state.

Alternatively, the single virtual V2X message may include cluster information on a geographic area including location information on the first VRU and location information on the second VRU.

Advantageous Effects

According to various embodiments of the present disclosure, when a change in the state of a vulnerable road user (VRU) is detected, a VRU message based on soft vehicle-to-everything (V2X) may be converted into a virtual V2X message and then transmitted, so that surrounding vehicles with no soft V2X modules may be notified the presence of the VRU. Accordingly, an effective autonomous driving system may be implemented based on complement between soft V2X and V2X.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
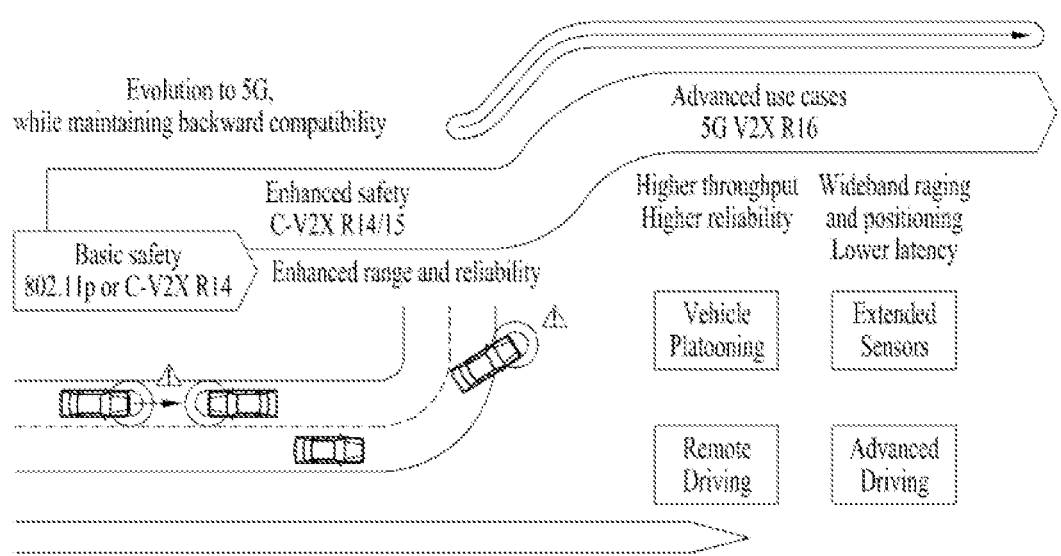
FIG. 1 is a diagram for explaining by comparing vehicle-to-everything (V2X) communication based on radio access technology (RAT) before new radio (NR) and V2X communication based on NR.

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
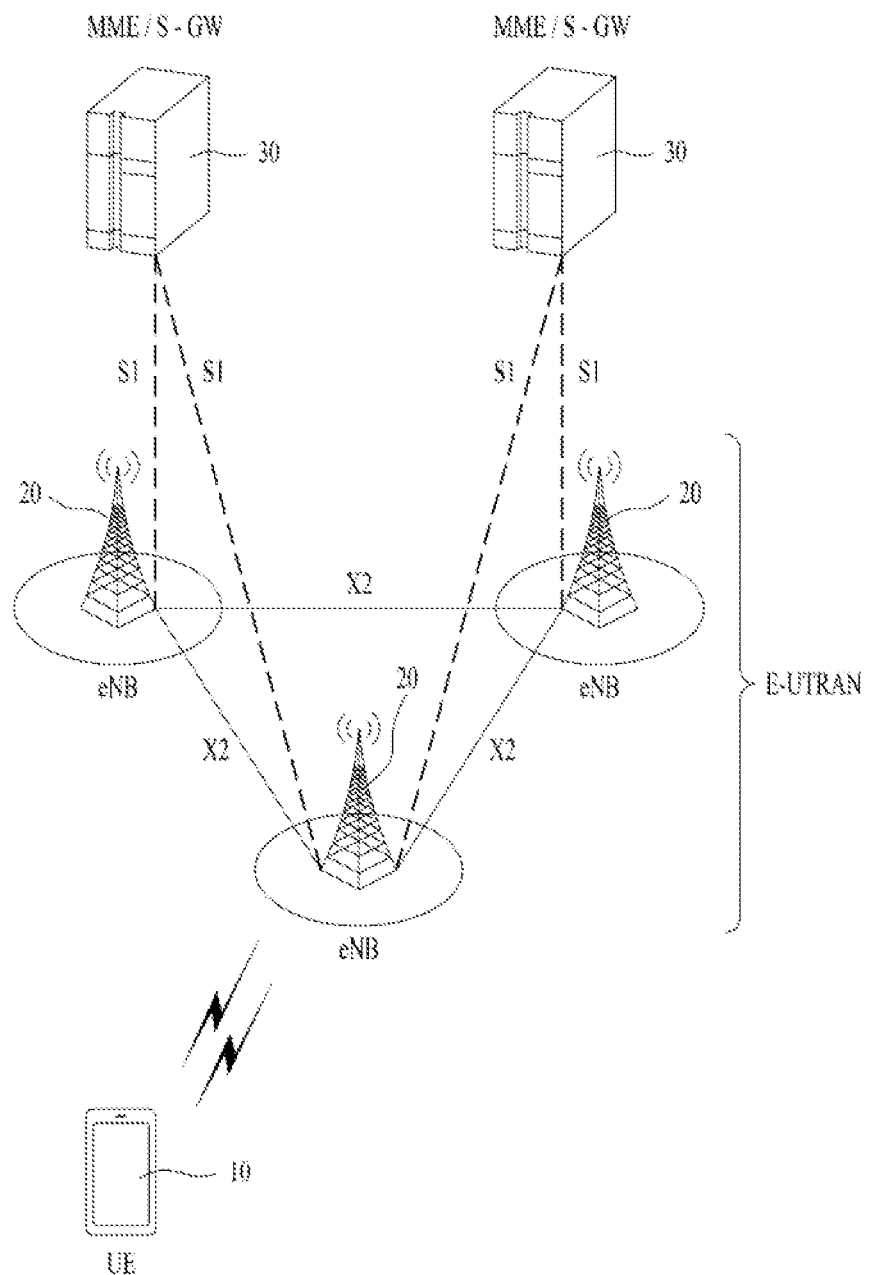
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
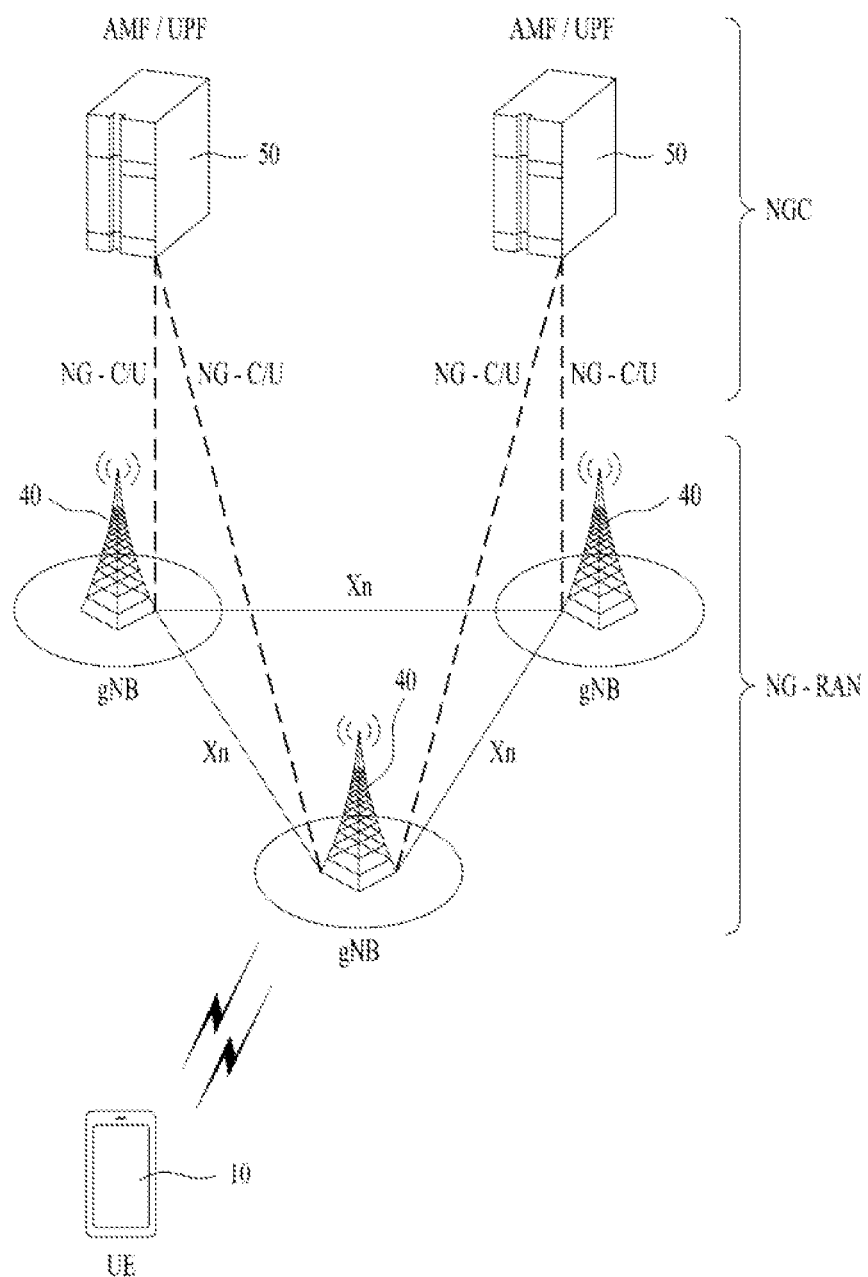
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
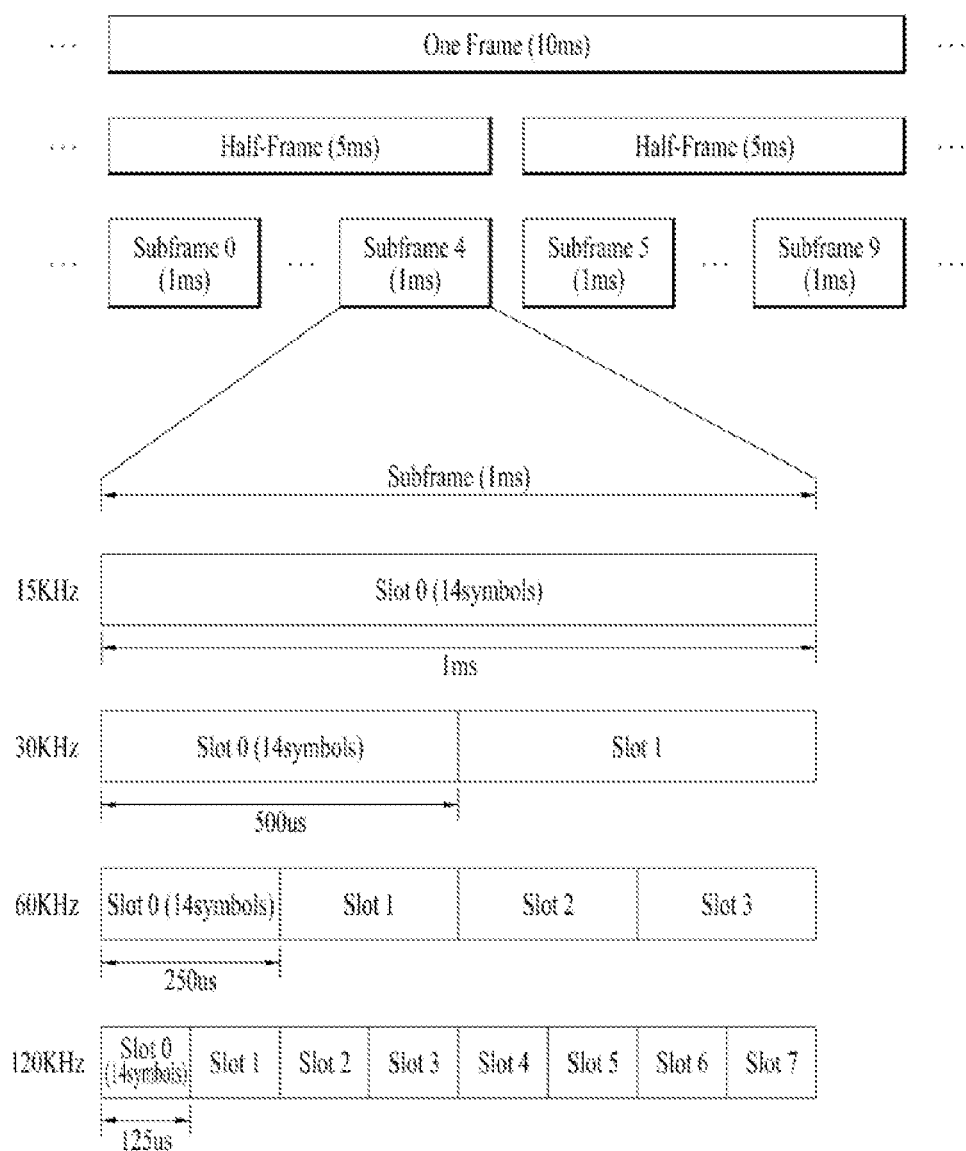
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration μ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
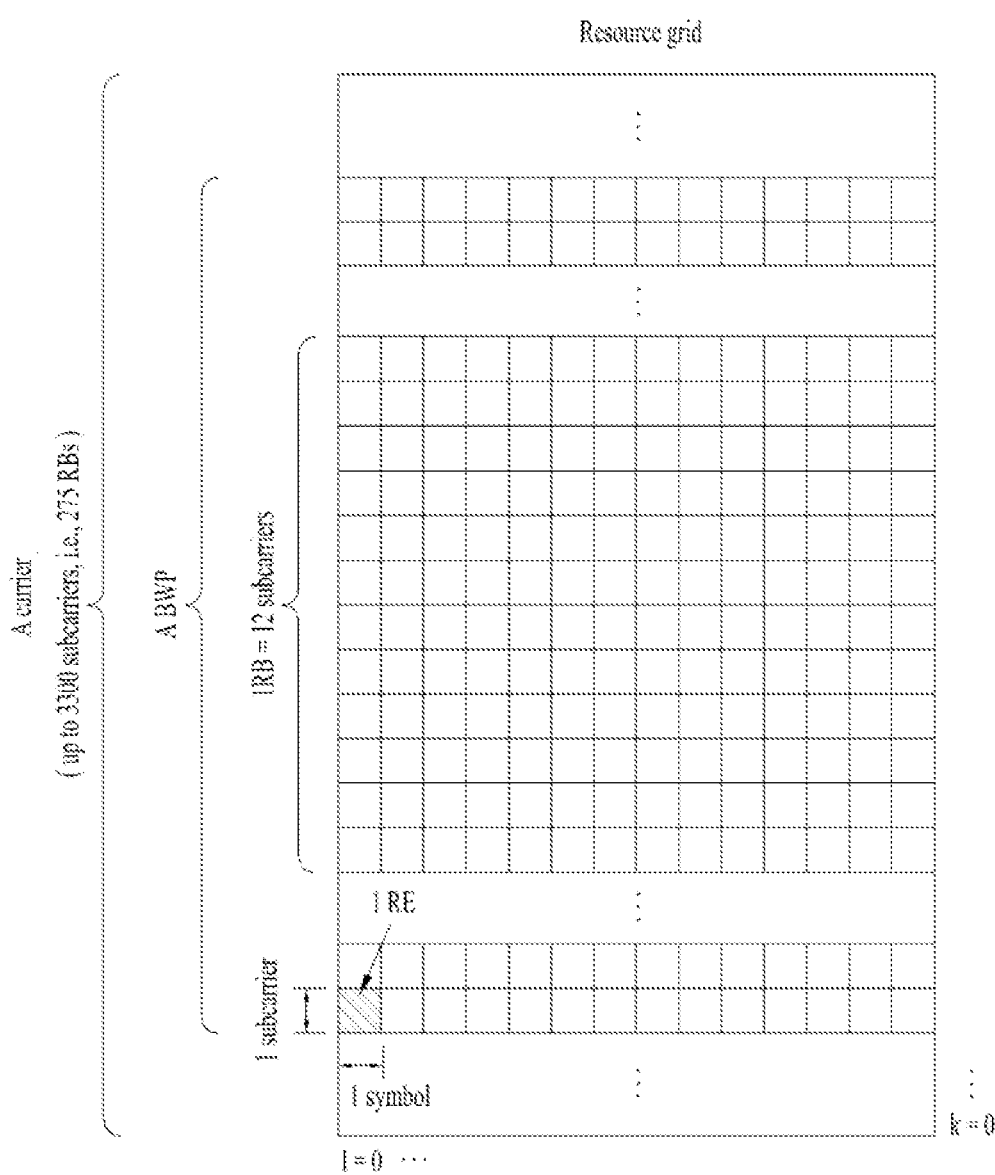
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
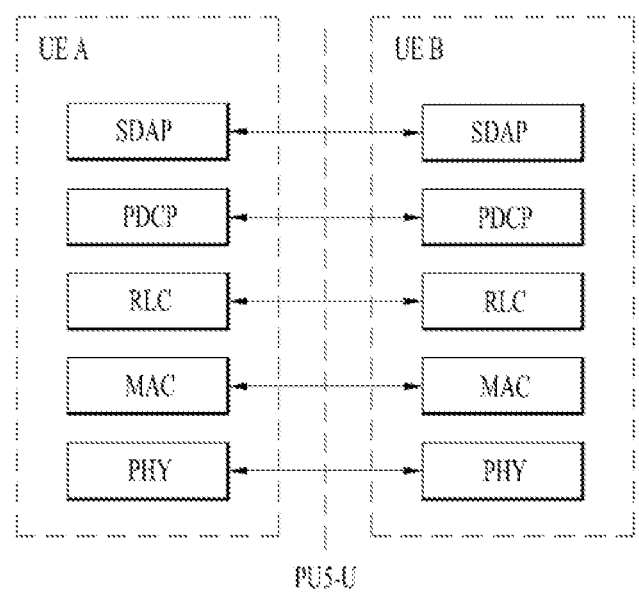
FIG. 6 illustrates a radio protocol architecture for SL communication.
Figure 6:
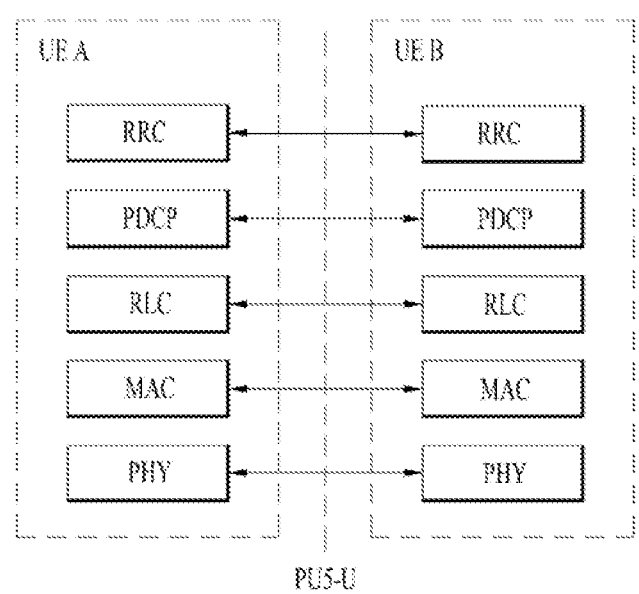

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
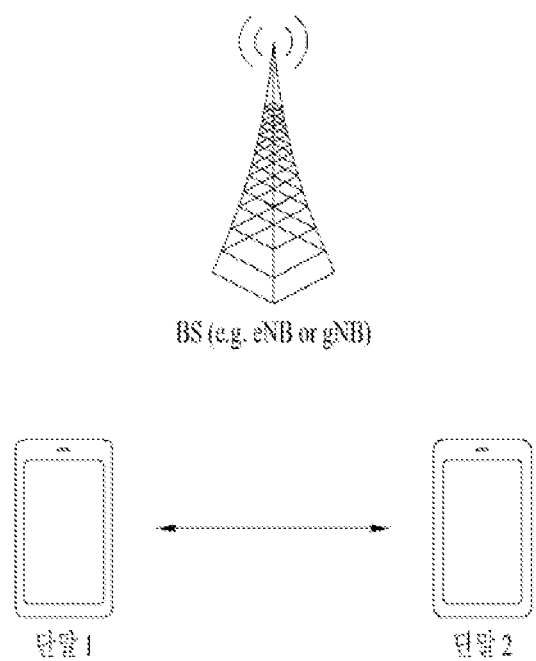
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
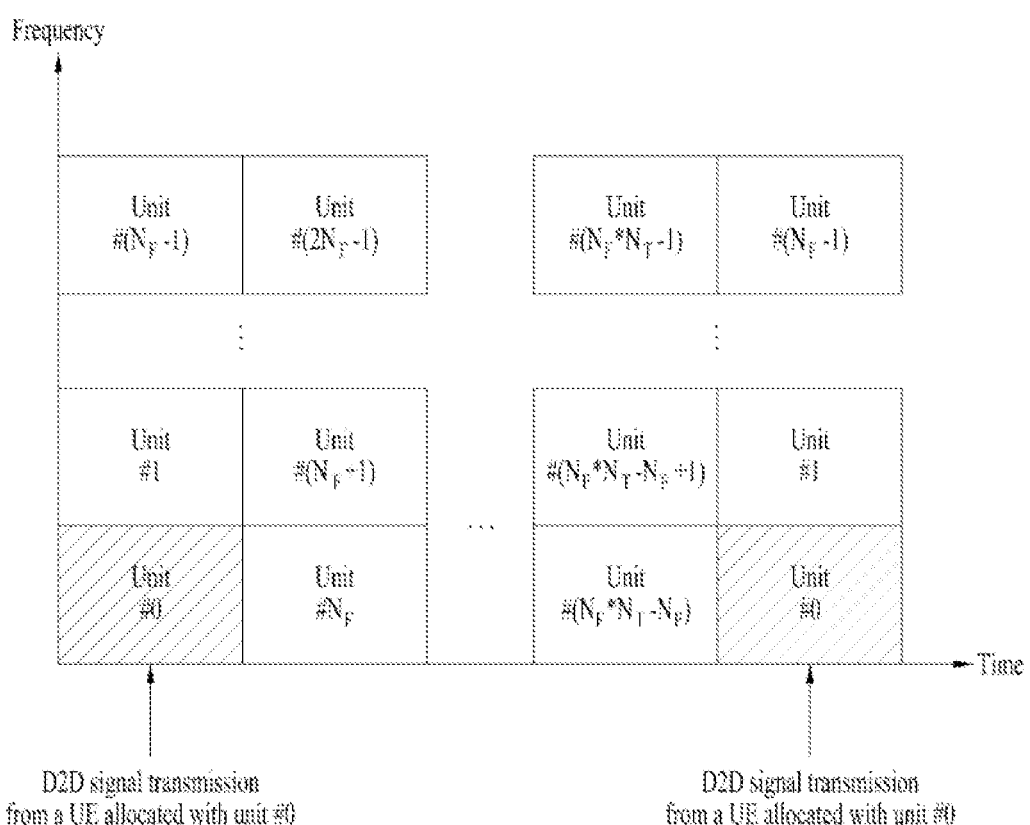
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
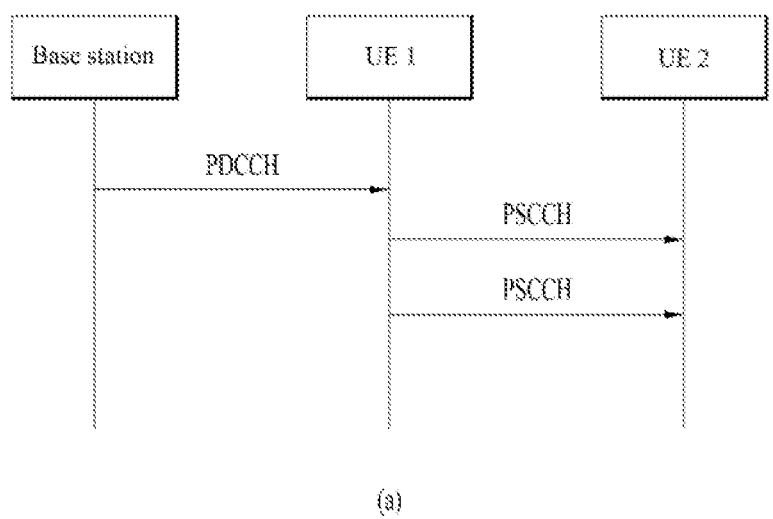
FIG. 9 illustrates a procedure in which UEs perform V2X or SL communication according to a transmission mode.
Figure 9:
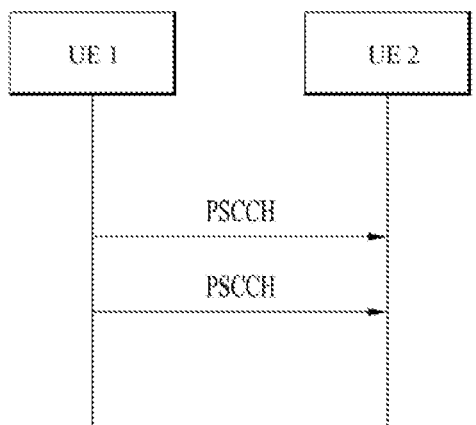

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(*a*) illustrates a UE operation related to LTE transmission mode 1 or LTE transmission mode 3. Alternatively, for example, FIG. 9-(*a*) illustrates a UE operation related to NR resource allocation mode 1. For example, LTE transmission mode 1 may be applied to general SL communication, and LTE transmission mode 3 may be applied to V2X communication.

For example, FIG. 9-(*b*) illustrates a UE operation related to LTE transmission mode 2 or LTE transmission mode 4. Alternatively, for example, FIG. 9-(*b*) illustrates a UE operation related to NR resource allocation mode 2.

Referring to FIG. 9-(*a*), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

Generally, for the purpose of overcoming the pathloss problem when using a very high frequency such as mmWave, beamforming may be used. In order to use such beamforming, the best beam pair should be detected from among several beam pairs between a transmitter and a receiver. From the viewpoint of the receiver, the above-mentioned process may be referred to as a beam acquisition process or a beam tracking process. In particular, since analog beamforming is used in mmWave, the vehicle needs to perform beam sweeping that performs beam switching in different directions at different time points using an antenna array of the vehicle in the beam acquisition or beam tracking process.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as ITS stations.

Figure 10:
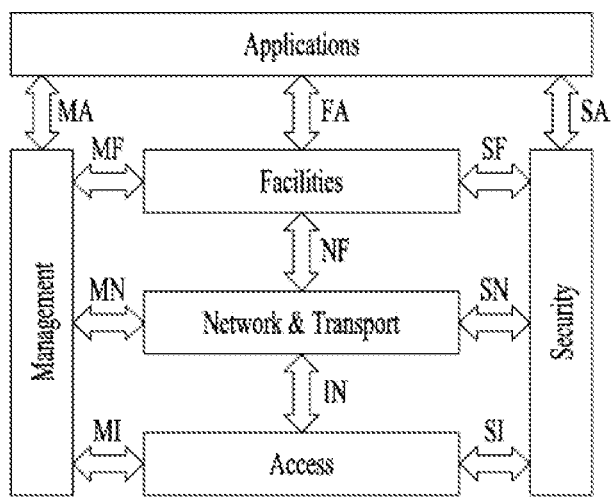
FIG. 10 is a diagram for explaining an intelligent transport system (ITS) station reference architecture.

FIG. 10 is a diagram for explaining an ITS station reference architecture.

The ITS station reference architecture may include an access layer, a network & transport layer, a facilities layer, entities for security and management, and an application layer at the top. Basically, the ITS station reference architecture follows a layered OSI model.

Specifically, features of the ITS station reference architecture based on the OSI model are illustrated. The access layer of the ITS station corresponds to OSI layer 1 (physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers. Each layer of the ITS station exchanges data transmitted or received through vehicle communication and additional information for various purposes through an interface. The abbreviations of various interfaces are described below.

MA: Interface between management entity and application layer
MF: Interface between management entity and facilities layer
MN: Interface between management entity and networking & transport layer
MI: Interface between management entity and access layer
FA: Interface between facilities layer and ITS-S applications
NF: Interface between networking & transport layer and facilities layer
IN: Interface between access layer and networking & transport layer
SA: Interface between security entity and ITS-S applications
SF: Interface between security entity and facilities layer
SN: Interface between security entity and networking & transport layer
SI: Interface between security entity and access layer A main concept of the ITS station reference architecture is to allow each layer with a special function to process communication on a layer basis, between two end vehicles/users included in a communication network. That is, when a V2V message is generated, the data is passed through each layer downwards layer by layer in the vehicle and the ITS system (or other ITS-related UEs/systems), and a vehicle or ITS system (or other ITS-related UEs/systems) receiving the message passes the message upwards layer by layer.

The ITS system operating through vehicle communication and the network was organically designed in consideration of various access technologies, network protocols, communication interfaces, etc. to support various use-cases, and the roles and functions of each layer described below may be changed depending on a situation. The main functions of each layer will be briefly described.

The application later actually implements and supports various use-cases. For example, the application layer provides security, efficient traffic information, and other entertainment information.

The application layer controls an ITS station to which an application belongs in various manners or provides services by transferring a service message to an end vehicle/user/infrastructure through the access layer, the network & transport layer, and the facilities layer, which are lower layers of the application layer, by vehicle communication. In this case, the ITS application may support various use-cases. In general, these use-cases may be supported by grouping into other applications such as road-safety, traffic efficiency, local services, and infotainment. Application classification, use-cases, etc. may be updated when a new application scenario is defined. Layer management serves to manage and service information related to operation and security of the application layer, and the related information is transmitted and shared bidirectionally through an MA and an SA (or service access point (SAP), e.g. MA-SAP or SA-SAP). A request from the application layer to the facilities layer or a service message and related information from the facilities layer to the application layer may be delivered through an FA.

The facilities layer serves to support effective implementation of various use-cases defined in an application layer of a higher layer. For example, the facilities layer may perform application support, information support, and session/communication support.

The facilities layer basically supports the 3 higher layers of the OSI model, for example, a session layer, a presentation layer, and the application layer, and functions. Specifically, the facilities layer provides facilities such as application support, information support, and session/communication support, for the ITS. Here, the facilities mean components that provide functionality, information, and data.

The application support facilities support the operation of ITS applications (mainly generation of a message for the ITS, transmission and reception of the message to and from a lower layer, and management of the message). The application support facilities include a cooperative awareness (CA) basic service and a decentralized environmental notification (DEN) basic service. In the future, facilities entities for new services such as cooperative adaptive cruise control (CACC), platooning, a vulnerable roadside user (VRU), and a collective perception service (CPS), and related messages may be additionally defined.

The information support facilities provide common data information or a database to be used by various ITS applications and includes a local dynamic map (LDM).

The session/communication support facilities provide services for communications and session management and include an addressing mode and session support.

Facilities may be divided into common facilities and domain facilities.

The common facilities are facilities that provide common services or functions required for various ITS applications and ITS station operations, such as time management, position management, and service management.

The domain facilities are facilities that provide special services or functions required only for some (one or more) ITS applications, such as a DEN basic service for road hazard warning applications (RHW). The domain facilities are optional functions and are not used unless supported by the ITS station.

Layer management serves to manage and service information related to the operation and security of the facilities layer, and the related information is transmitted and shared bidirectionally through an MF and an SF (or MF-SAP and SF-SAP). The transfer of service messages and related information from the application layer to the facilities layer or from the facilities layer to the application layer is performed through an FA (or FA-SAP), and bidirectional service messages and related information between the facilities layer and the lower networking & transport layer are transmitted by an NF (or NF-SAP).

The network & transport layer servers to configure a network for vehicle communication between homogenous or heterogeneous networks through support of various transport protocols and network protocols. For example, the network & transport layer may provide Internet access, routing, and vehicle networking using Internet protocols such as TCP/UDP+IPv6 and form a vehicle network using a basic transport protocol (BTP) and GeoNetworking-based protocols. In this case, networking using geographic position information may also be supported. A vehicle network layer may be designed or configured depending on technology used for the access layer (access layer technology-independently) or regardless of the technology used for the access layer (access layer technology-independently or access layer technology agnostically).

Functionalities of the European ITS network & transport layer are as follows. Basically, functionalities of the ITS network & transport layer are similar to or identical to those of OSI layer 3 (network layer) and layer 4 (transport layer) and have the following characteristics.

Figure 11:
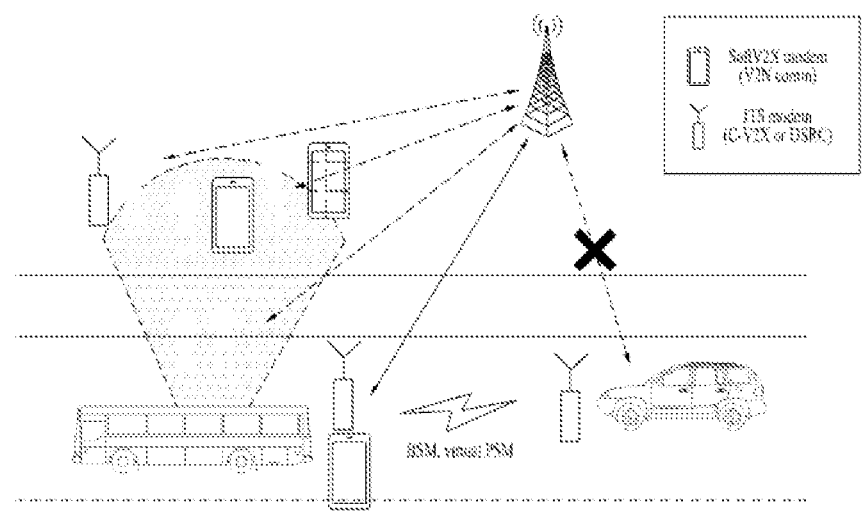
FIG. 11 is a diagram for explaining a vulnerable road user (VRU) sending a VRU message based on soft V2X communication, a V2X vehicle performing V2X communication, a VRU sending a VRU message based on a conventional ITS, and a V2X vehicle performing soft V2X communication.
Figure 11:
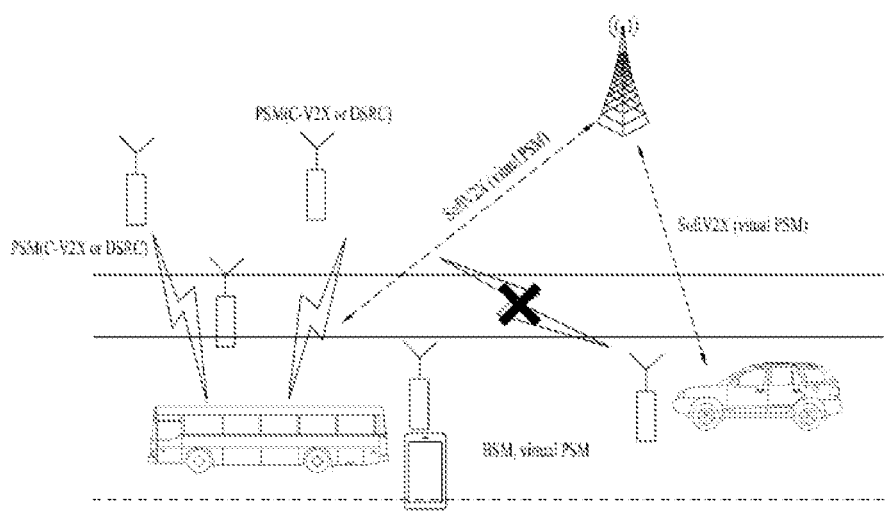

The transport layer is a connection layer that delivers service messages and related information received from higher layers (the session layer, the presentation layer, and the application layer) and lower layers (the network layer, the data link layer, and the physical layer). The transport layer serves to manage data transmitted by an application of the ITS station so that the data accurately arrives at an application process of the ITS station as a destination. Transport protocols that may be considered in European ITS include, for example, TCP and UDP used as legacy Internet protocols as illustrated in FIG. 11, and there are transport protocols only for the ITS, such as the BTS.

The network layer serves to determine a logical address and a packet forwarding method/path, and add information such as the logical address of a destination and the forwarding path/method to a header of the network layer in a packet received from the transport layer. As an example of the packet method, unicast, broadcast, and multicast between ITS stations may be considered. Various networking protocols for the ITS may be considered, such as GeoNetworking, IPv6 networking with mobility support, and IPv6 over GeoNetworking. In addition to simple packet transmission, the GeoNetworking protocol may apply various forwarding paths or transmission ranges, such as forwarding using position information about stations including vehicles or forwarding using the number of forwarding hops.

Layer management related to the network & transport layer serves to manage and provide information related to the operation and security of the network & transport layer, and the related information is transmitted and shared bidirectionally through an MN (or MN-SAP) and an SN (or SN-SAP). Transmission of bidirectional service messages and related information between the facilities layer and the networking & transport layer is performed by an NF (or NF-SAP), and service messages and related information between the networking & transport layer and the access layer are exchanged by an IN (or IN-SAP).

A North American ITS network & transport layer supports IPv6 and TCP/UDP to support existing IP data like Europe, and a wave short message protocol (WSMP) is defined as a protocol only for the ITS.

A packet structure of a wave short message (WSM) generated according to the WSMP includes a WSMP header and WSM data carrying a message. The WSMP header includes Version, PSID, WSMP header extension fields, WSM WAVE element ID, and Length.

Version is defined by a WsmpVersion field indicating an actual WSMP version of 4 bits and a reserved field of 4 bits. PSID is a provider service identifier, which is allocated according to an application in a higher layer and helps a receiver to determine an appropriate higher layer. Extension fields is a field for extending the WSMP header, and includes information such as a channel number, a data rate, and transmit power used. WSMP WAVE element ID specifies the type of a WSM to be transmitted. Length specifies the length of transmitted WSM data in octets through a WSMLength field of 12 bits, and the remaining 4 bits are reserved. LLC Header allows IP data and WSMP data to be transmitted separately and is distinguished by Ethertype of a SNAP. The structures of the LLC header and the SNAP header are defined in IEEE802.2. When IP data is transmitted, Ethertype is set to 0x86DD in the LLC header. When WSMP is transmitted, Ethertype is set to 0x88DC in the LLC header. The receiver identifies Ethertype. If Ethertype is 0x86DD, the receiver transmits upward the packet to an IP data path, and if Ethertype is 0x88DC, the receiver transmits upward the packet to a WSMP path.

The access layer serves to transmit a message or data received from a higher layer on a physical channel. As access layer technologies, ITS-G5 vehicle communication technology based on IEEE 802.11p, satellite/broadband wireless mobile communication technology, 2G/3G/4G (long-term evolution (LTE), etc.)/5G wireless cellular communication technology, cellular-V2X vehicle-dedicated communication technologies such as LTE-V2X and NR-V2X (new radio), broadband terrestrial digital broadcasting technology such as DVB-T/T2/ATSC3.0, and GPS technology may be applied.

A data link layer is a layer that converts a physical line between adjacent nodes (or between vehicles) with noise into a communication channel without transmission error, for use in the higher network layer. The data link layer performs a function of transmitting/delivering/forwarding L3 protocols, a framing function of dividing data to be transmitted into packets (or frames) as transmission units and grouping the packets, a flow control function of compensating for a speed difference between a transmitter and a receiver, and a function of (because there is a high probability that an error and noise occurs randomly in view of the nature of a physical transmission medium) detecting a transmission error and correcting the error or detecting a transmission error based on a timer and an ACK signal by a transmitter in a method such as automatic repeat request (ACK) and retransmitting a packet that has not been correctly received. In addition, to avoid confusion between packets or ACK signals, the data link layer performs a function of assigning a sequence number to the packets and the ACK signals, and a function of controlling establishment, maintenance, and disconnection of a data link between network entities, and data transmission between network entities. The main functions of logical link control (LLC), radio resource control (RRC), packet data convergence protocol (PDCP), radio link control (RLC), medium access control (MAC), and multi-channel operation (MCO) included in the data link layer will be described below.

An LLC sub-layer enables the use of different lower MAC sub-layer protocols, and thus enables communication regardless of network topology. An RRC sub-layer performs functions such as broadcasting of cell system information required for all UEs within a cell, management of delivery of paging messages, management (setup/maintenance/release) of RRC connection between a UE and an E-UTRAN, mobility management (handover), transmission of UE context between eNodeBs during handover, UE measurement reporting and control therefor, UE capability management, temporary assignment of a cell ID to a UE, security management including key management, and RRC message encryption. A PDCP sub-layer may performs functions such as IP packet header compression in a compression method such as robust header compression (ROHC), cyphering of a control message and user data, data integrity, and data loss prevention during handover. RLC sub-layer delivers a packet received from the higher PDCP layer in an allowed size of the MAC layer through packet segmentation/concatenation, increases data transmission reliability by transmission error and retransmission management, checks the order of received data, reorders data, and checks redundancy. A MAC sub-layer performs functions such as control of the occurrence of collision/contention between nodes for use of shared media among multiple nodes, matching a packet delivered from the higher layer to a physical layer frame format, assignment and identification of the address of the transmitter/receiver, detection of a carrier, collision detection, and detection of obstacles on the physical medium. An MCO sub-layer enables efficient provision of various services on a plurality of frequency channels. The main function of MCO sub-layer is to effectively distribute traffic load of a specific frequency channel to other channels to minimize collision/contention of communication information between vehicles in each frequency channel.

The physical layer is the lowest layer in the ITS layer architecture. The physical layer defines an interface between a node and a transmission medium and performs modulation, coding, and mapping of a transport channel to a physical channel, for bit transmission between data link layer entities and informs the MAC sub-layer of whether a wireless medium is busy or idle by carrier sensing or clear channel assessment (CCA).

Transmission of Virtual V2X Messages Based on VRU Message

When using public transport, pedestrians are located at the intersection of lanes and walkways, which may create a dangerous situation to VRUs. However, the safety of passengers may not be guaranteed if every passenger (or VRU) does not have a VRU device and the VRU device has low transmit power. In addition, surrounding vehicles may not have a module configured to receive a VRU message transmitted by the VRU device, and as a result, the vehicles may not be able to recognize the user of the VRU device, which corresponds to a passenger or pedestrian.

In addition, when a VRU uses the soft V2X system, no PC5 devices may be installed in mobile phones used by many VRUs due to the characteristics of the system. In this case, the VRU may transmit VRU safety information (or a VRU message) via the Uu interface based on the soft V2X system, but a PC5-based vehicle (i.e., a vehicle based on dedicated short-range communication (DSRC) other than LTE) among surrounding vehicles may not receive the VRU message.

Hereinafter, a method by which a V2X device or vehicle converts a VRU message transmitted by a VRU device into a V2X message and retransmits the message will be described in detail.

FIG. 11 is a diagram for explaining a VRU sending a VRU message based on soft V2X communication, a V2X vehicle performing V2X communication, a VRU sending a VRU message based on a conventional ITS, and a V2X vehicle performing soft V2X communication.

Referring to FIG. 11(a), when VRUs having VRU devices receiving soft V2X (V2N) services such as smartphones, etc. get off a bus (e.g., school bus, taxi, vehicle, etc.), a collision may occur between the VRUs and rear vehicles.

That is, even when a soft V2X device of a VRU transmits a soft V2X signal (or VRU message) via the Uu interface, a nearby conventional cellular V2X (C-V2X) (or DSRC) vehicle may not be able to receive the soft V2X signal if the vehicle does not have a soft V2X module. That is, the C-V2X (or DSRC) vehicle may not recognize the user. In addition, the VRU device of the user may not be able to receive a C-V2X signal from the vehicle if the VRU device has no V2X module mounted therein. As a result, the VRU device may not recognize the vehicle existing in the vicinity. As described above, the vehicle and the user of the VRU device may not recognize each other. That is, users alighting from a V2X vehicle such as a bus and rear vehicles may not recognize each other. In this case, there is a risk of collisions between C-V2X (or DSRC) vehicles and VRUs (hereinafter referred to as users).

Referring to FIG. 11(b), even when a V2X device of a VRU transmits a V2X signal through direct communication unlike FIG. 11(a), a nearby soft V2X vehicle may not be able to receive any VRU signals of the conventional ITS system if the soft V2X vehicle does not have a conventional ITS module.

In this case, the soft V2X vehicle may not recognize the user. In addition, the VRU device of the user may not be able to recognize the vehicle existing in the vicinity if the VRU device has no soft V2X module and thus is incapable of receiving a soft V2X signal from the vehicle. As described above, the vehicle and the user of the VRU device may not recognize each other.

Therefore, there is need for a method by which a V2X vehicle from which users get off converts a VRU message related to the users into a V2X message and transmits the V2X message to C-V2X vehicles. In other words, the V2X vehicle, which is a V2X device, may receive a VRU message, which is transmitted by a VRU, from the network and transmit a V2X message including information on the VRU included in the VRU message through an ITS modem or V2X module. Alternatively, a method for a V2X vehicle from which users get off to convert a V2X message related to the users into a virtual VRU message and transmits the virtual VRU message to soft V2X vehicles may be required.

Figure 12:
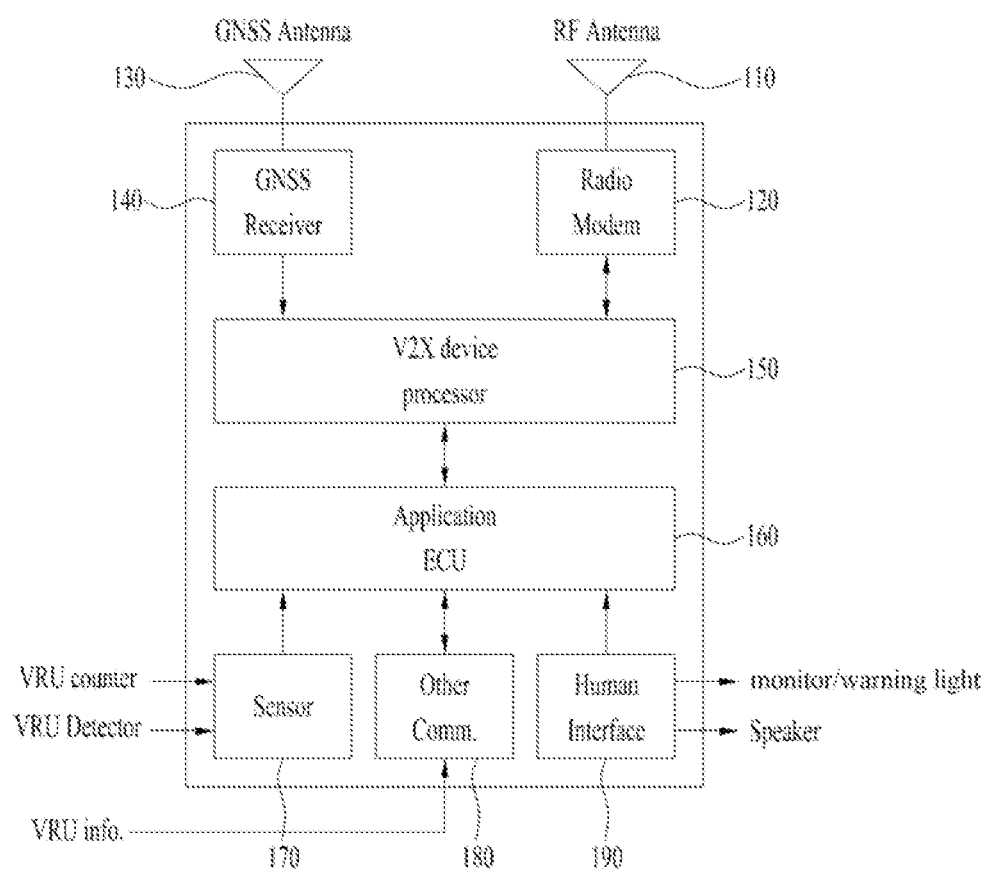
FIGS. 12 and 13 are block diagrams for explaining the configuration of a V2X vehicle that transmits a virtual V2X message.
Figure 13:
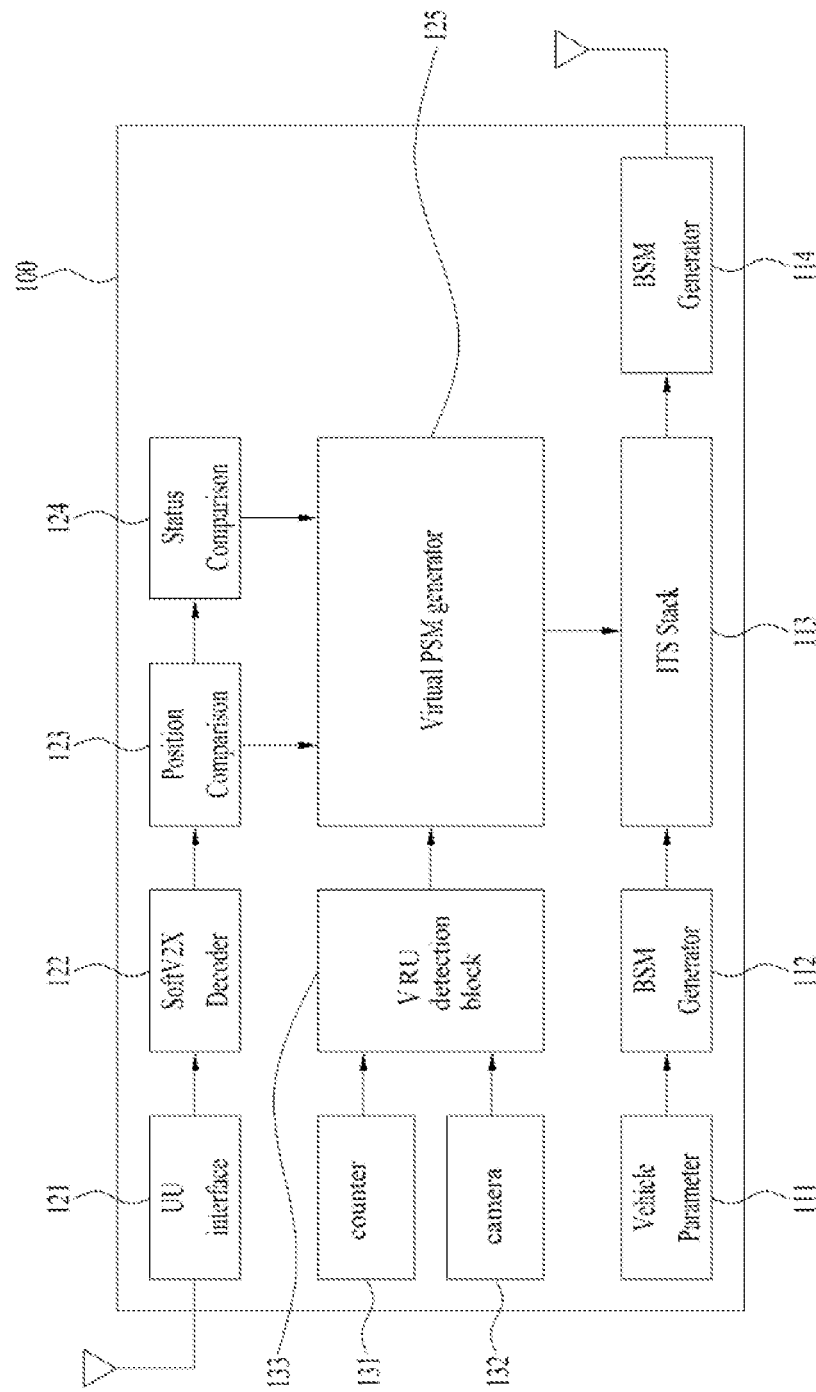

FIGS. 12 and 13 are block diagrams for explaining the configuration of a V2X vehicle that transmits a virtual V2X message.

Referring to FIG. 12, a V2X vehicle 100 may include a V2X device or module including a radio frequency (RF) antenna 110, a wireless modem 120, a global navigation satellite system (GNSS) antenna 130, a GNSS receiver 140, and a V2X device processor 150.

To convert a received VRU message into a virtual V2X message, the V2X vehicle 100 may include an application electronic control unit (ECU) 160, a sensor 170 configured to detect a VRU, and other communication devices 180 (i.e., other communication modules capable of receiving communication signals from VRUs such as DSRC, Bluetooth, NFC, Wi-Fi, etc.) The other communication devices 180 may receive soft V2X VRU information described above. The V2X vehicle 100 may further include a human interface unit 190 configured to warn a VRU alighting therefrom of danger.

Referring to FIG. 13, a V2X vehicle may include a plurality of components configured to transmit obtained VRU information in a virtual V2X message through an ITS modem installed in the V2X vehicle.

Specifically, a conventional vehicle ITS system may include: a vehicle parameter extractor configured to extract parameters based on vehicle information; a BSM generator 112 configured to generate a BSM based on information in the extracted parameters; and an ITS stack and modem 113 configured to generate a packet suitable for an ITS stack based on the generated BSM and transmit the generated packet as a V2X message through an ITS access layer and/or ITS modem.

To convert a VRU message into a virtual V2X messages and transmit the virtual V2X message, the V2X vehicle may further include: a Uu interface 121, a soft V2X decoder 122, a position comparator 123, a state comparator 124, a counter 131, a camera 132, a VRU detection block 133, and/or a virtual personal safety message (PSM) generator or virtual V2X message generator 125, in addition to the conventional vehicle ITS system.

Specifically, the V2X vehicle may receive a VRU message from the network through the Uu interface 121 to obtain or detect information on an adjacent VRU. Alternatively, the V2X vehicle may acquire or detect information on a VRU through the counter 131 and the camera 132. Hereinafter, a method in which a V2X vehicle acquires or detects information on a VRU by means of the counter 131 and the camera 132 will be first described.

Figure 14:
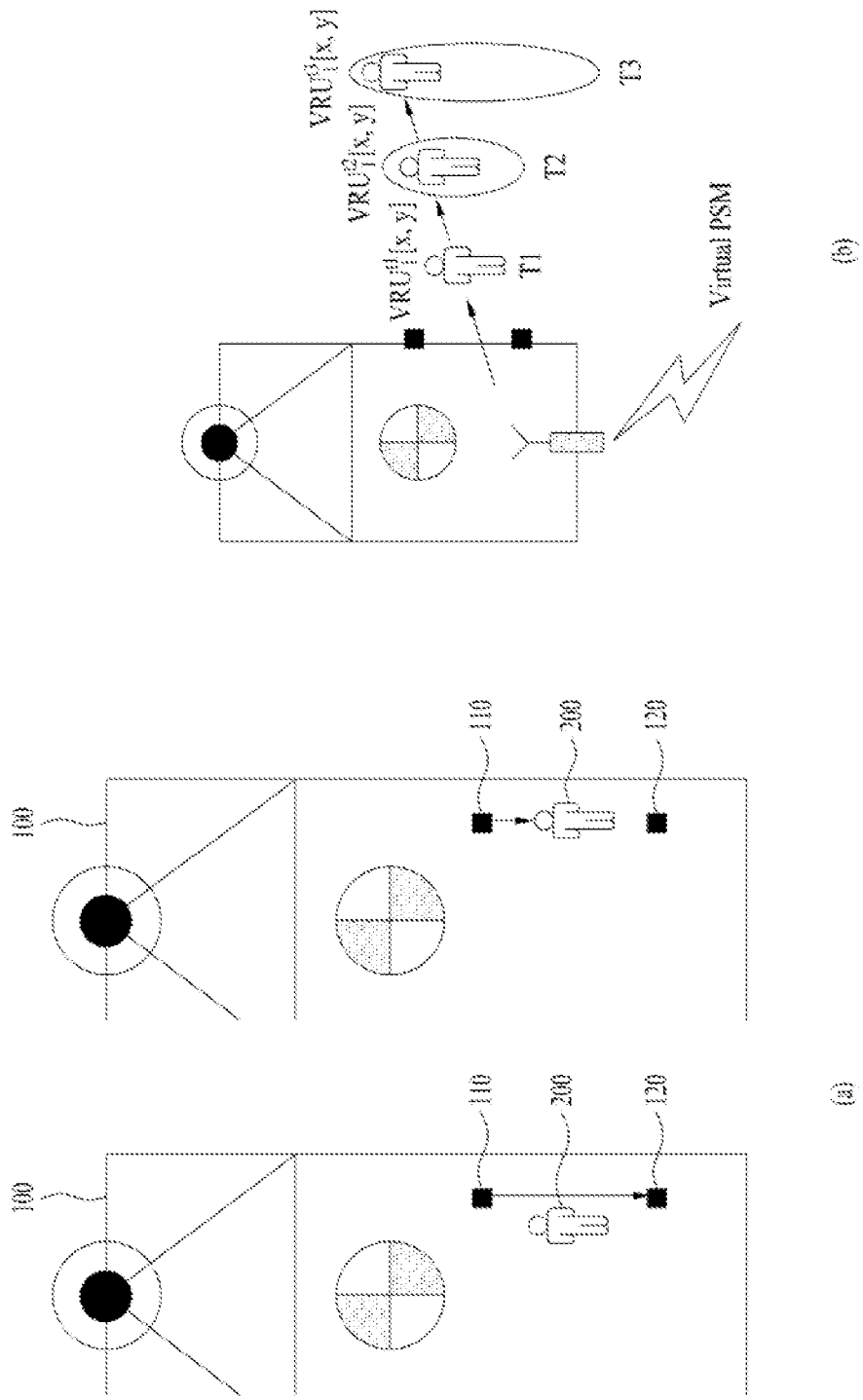
FIGS. 14, 15, and 16 are diagrams for explaining a method of detecting VRU(s) riding in a V2X vehicle.
Figure 15:
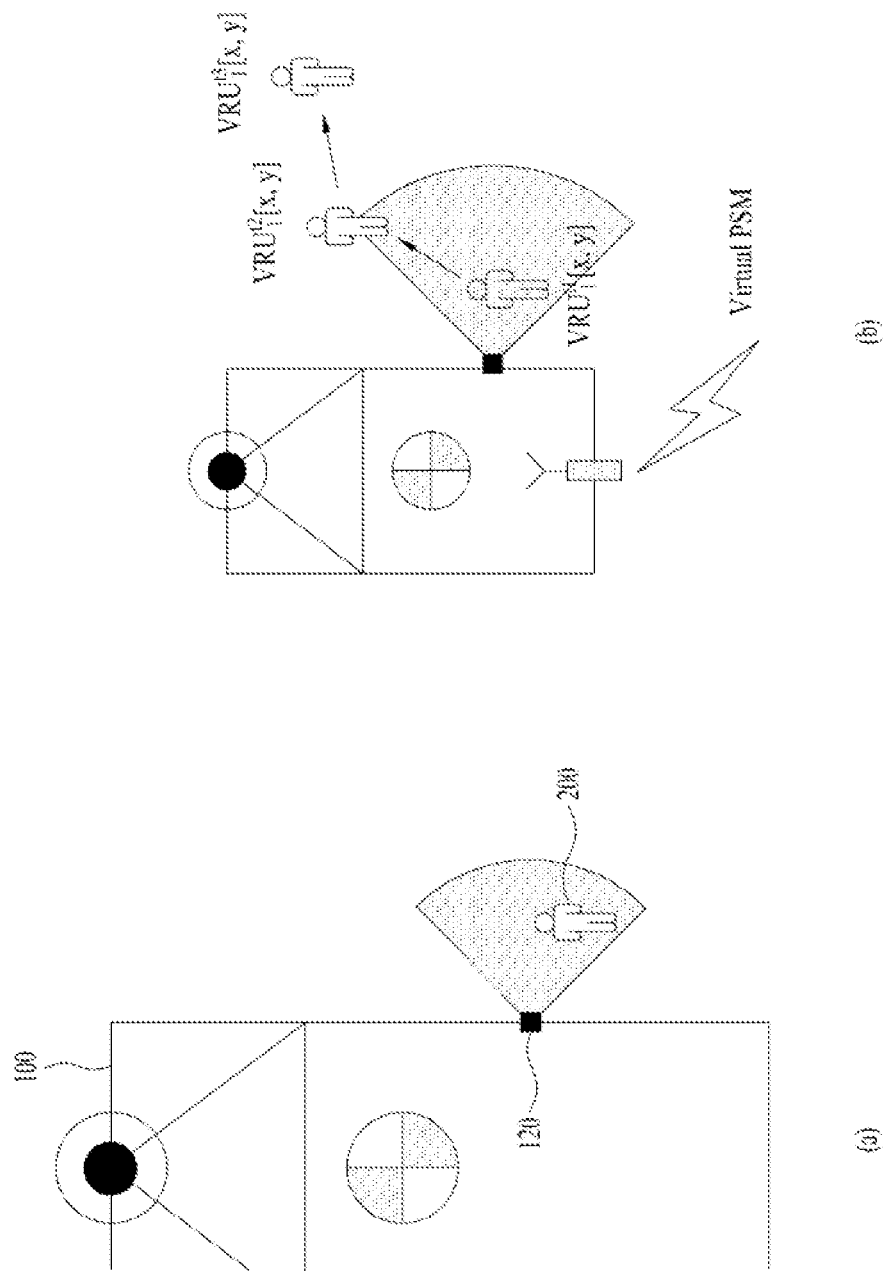
Figure 16:
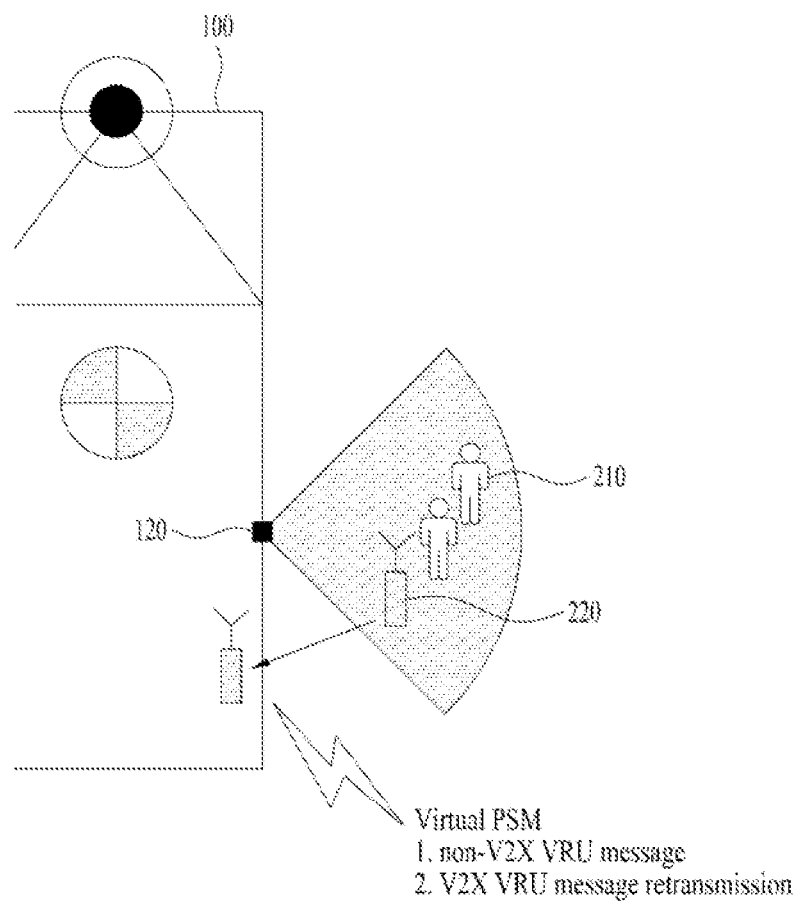

FIGS. 14, 15, and 16 are diagrams for explaining a method of detecting VRU(s) riding in a V2X vehicle.

Referring to FIG. 14(*a*), a V2X vehicle may predict VRU(s) or the movement of the VRU(s) by means of a counter. Specifically, the V2X vehicle may use a VRU detector including a transmitter 110 and a receiver 120 of an infrared or ultrasonic sensor installed on the exit door. The V2X vehicle may use the detector to obtain the alighting pattern of the VRU. The V2X vehicle may measure the total number of alighting VRUs, a VRU alighting time, and a VRU alighting interval by means of the infrared or ultrasonic sensor and generate cluster information on the alighting VRUs based on the measurements. Then, the V2X vehicle may transmit a V2X message (or virtual PSM) including the generated cluster information on the VRUs.

For example, referring to FIG. 14(*b*), when one VRU gets off, the cluster information may indicate a candidate area in which the VRU is expected to be present over time with respect to the alighting point of the VRU.

Alternatively, when a plurality of VRUs get off, the V2X vehicle may generate the cluster information by overlapping the VRUs or candidate areas for the VRUs with each other. When several people get off, the V2X vehicle may overlap the state of a previous VRU with the state of a next VRU and transmit the overlapping states, so that surrounding vehicles may predict the states of the VRUs (or passengers). The V2X vehicle may transmit a V2X message, which is a virtual VRU message including the cluster information, to provide surrounding vehicles with information on VRUs getting off in the vicinity thereof.

Alternatively, as shown in FIG. 15(*a*), a V2X vehicle may analyze VRU(s) or the states of the VRU(s) according to image processing based on a vehicle-dedicated camera. Specifically, the V2X vehicle may track the VRU(s) based on a camera installed on the exit door of the V2X vehicle (or public transportation vehicle). The V2X vehicle may analyzes the pattern of the tracked VRU(s) to determine the state of each VRU. The V2X vehicle may transmit a virtual V2X message which is a virtual VRU message including information on the analyzed VRU pattern to neighboring vehicles.

For example, referring to FIG. 15(*b*), when one VRU gets off, the camera of the V2X vehicle may detect the alighting VRU and derive the location of the VRU at a time T 1. Then, the camera of the V2X vehicle may derive the location of the VRU again at a next time T2. Alternatively, when a plurality of VRUs get off, the V2X vehicle may derive the location of each of the plurality of VRUs at a specific time by means of the camera.

Referring to FIG. 16, a VRU alighting from a V2X vehicle may include a V2X module or V2X device. In this case, the V2X vehicle may receive a PSM, which is a V2X message transmitted by the VRU, and determine whether the VRU that transmits the received PSM is a VRU getting off the V2X vehicle. When the VRU that transmits the PSM is the VRU getting of the V2X vehicle, the V2X vehicle may generate a virtual V2X message, which is a virtual VRU message for the received PSM, and retransmit the PSM. The V2X vehicle may support the characteristics of a VRU device such as small transmission period, low power, and low performance antenna transmission by retransmitting the PSM as the virtual V2X message.

Figure 17:
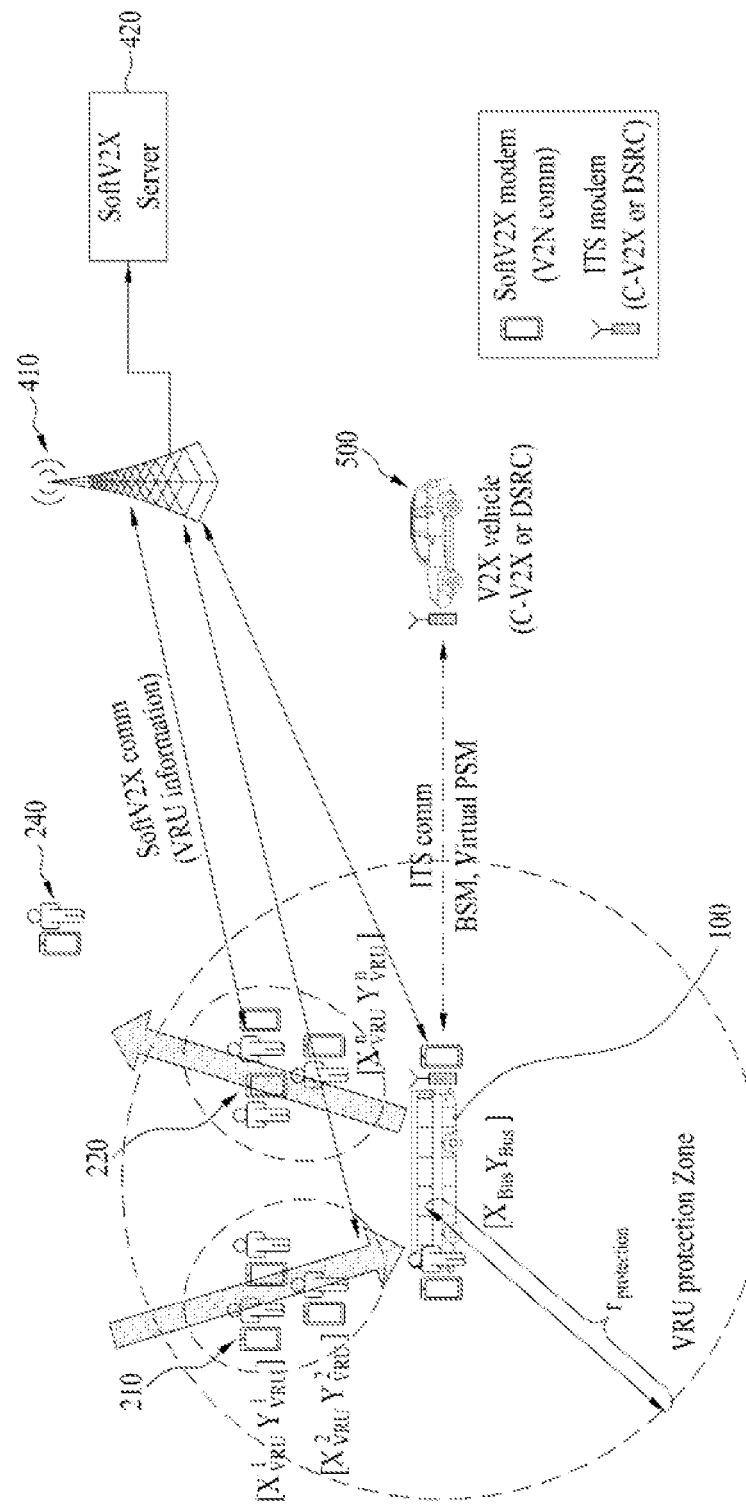
FIGS. 17 and 18 are diagrams for explaining a method by which a V2X vehicle analyzes the states of VRUs based on VRU messages and a method by which the V2X vehicle determines which VRU message needs to be converted into a virtual V2X message based on the analyzed states.
Figure 18:
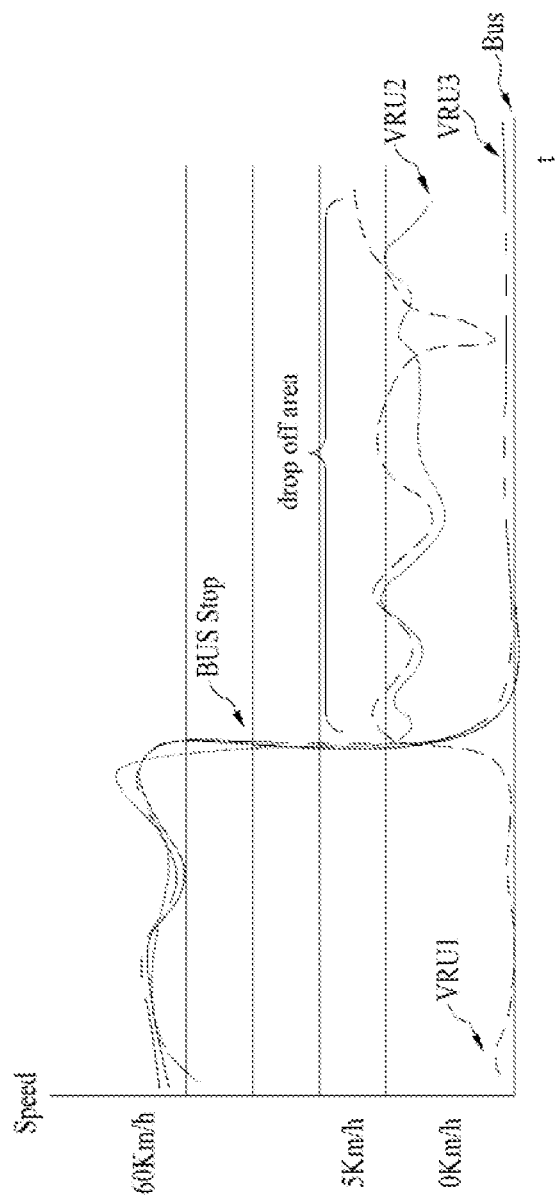

FIGS. 17 and 18 are diagrams for explaining a method by which a V2X vehicle analyzes the states of VRUs based on VRU messages and a method by which the V2X vehicle determines which VRU message needs to be converted into a virtual V2X message based on the analyzed states.

A V2X vehicle may analyze a surrounding soft V2X signal (or VRU message) and convert the soft V2X signal (or VRU message) into a virtual V2X message (or virtual PSM) according to the analysis result and retransmit the soft V2X signal. Accordingly, the V2X vehicle may provide neighboring V2X vehicles incapable of receiving the soft V2X signal (or VRU message) with state information on the VRU in the virtual V2X message.

Specifically, to protect the safety of a VRU, a V2X public transportation vehicle carrying passengers frequently may analyze a surrounding soft V2X signal, generate a PSM on behalf of the VRU, and inform surrounding V2X vehicles of the state of the VRU alighting therefrom by transmitting a signal to the surrounding V2X vehicles. For convenience of description, the V2X public transportation vehicle is mainly described as a bus, but the V2X public transportation vehicle may include vehicles having the purpose/characteristic of public transportation.

Referring to FIG. 17, a V2X vehicle 100 may include a soft V2X device configured to provide VRU safety by means of an ITS device and a smartphone. In addition, the V2X vehicle 100 may additionally include a component capable of transmitting a virtual PSM (or a virtual V2X message) by analyzing a soft V2X signal.

Various types of VRUs may exist around the V2X vehicle 100. The various types of VRUs may include a VRU 230 riding in V2X vehicle 100, a VRU 220 getting off the V2X vehicle 100, VRUs 210 clustered around the V2X vehicle 100 to board the V2X vehicle 100, and/or a VRU 240 walking around without relation to the V2X vehicle 100. Each VRU may communicate with a soft V2X server 420 through a BS 410 via the Uu interface to receive soft V2X related services. A surrounding V2X vehicle 500 is a vehicle with an ITS communication modem. The V2X vehicle 500 may receive a PSM or BSM from nearby vehicles or VRUs through PC5 or DSRC of C-V2X so as to be aware of danger around the vehicle 500. However, the V2X vehicle 500 may not receive a signal transmitted from a VRU with no ITS communication device, and as a result, the V2X vehicle 500 may not recognize the VRU.

The V2X vehicle 100 may include both the soft V2X device and ITS modem (C-V2X or DSRC). Although the V2X vehicle 100 is not a VRU, the V2X vehicle may include a device capable of analyzing a soft V2X signal and generating and transmitting a virtual PSM (or virtual V2X message) in order to transmit the virtual PSM on behalf of the VRU. Here, the virtual PSM signal may be generated by conversion of a VRU message transmitted based on soft V2X.

Referring to FIG. 18, the V2X vehicle 100 may determine the state of a surrounding VRU to retransmit a VRU message based on soft V2X. That is, the V2X vehicle 100 may be aware of the state of the surrounding VRU by analyzing the location and speed of the surrounding VRU.

In the analysis of the location of the surrounding VRU, the V2X vehicle 100 may analyze VRUs within a specific distance from the center of the V2X vehicle 100 according to Equation 1 below. That is, the V2X vehicle 100 may calculate the linear distance between the V2X vehicle 100 and the VRU and then determine VRUs existing within a predetermined distance ($r_{protection}$). In this case, the VRU 240, which walks outside the bus, does not board the V2X vehicle 100, and thus the VRU 240 may be excluded.

$$VRU_{protection} = VRU^i, i \ni (r_{protection} > \sqrt{(X_{bus}-X_{VRU}^i)^2 + (Y_{bus}-Y_{VRU}^i)^2})$$ [Equation 1]

On the other hand, when VRU states are analyzed based on only locations as described above, it may be difficult to identify a VRU getting on and/or alighting from the V2X vehicle 100 and a VRU already on board. Accordingly, the V2X vehicle 100 may compare the speeds of the VRUs.

For example, when the V2X vehicle 100 stops while driving, the speed of the V2X vehicle 100 stops (i.e., 0 km/h) at a specific time while driving at a speed (e.g., 60 km/h). When the door of the stationary V2X vehicle 100 is opened, the V2X vehicle 100 may compare the speeds of filtered VRUs through the location analysis. The VRUs 220 and 230 on board may move at the same speed as the V2X vehicle 100 until the V2X vehicle 100 stops, and the VRU 210 waiting for boarding may stop at the bus stop or move at a low speed. In this case, if the V2X vehicle 100 stops and the door is opened, the alighting VRU 220 may move with a walking speed unlike the stopped V2X vehicle 100 (i.e., VRU 2 in FIG. 18). On the other hand, the passengers 230 in the V2X vehicle 100 may have a speed of 0 km/h after the V2X vehicle 100 (e.g., bus) (VRU 3 in FIG. 18) stops. In addition, the VRUs 210 (VRU 1) who desire to board the V2X vehicle 100 may be in the stationary state before the V2X vehicle 100 stops, but the VRUs 210 may move after the V2X vehicle 100 stops. As described above, the V2X vehicle 100 may determine the states of soft V2X VRU devices around the V2X vehicle 100 based on the location analysis and the speed analysis.

In other words, the V2X vehicle 100 may receive a VRU message based on soft V2X. When information on the location of a VRU included in the received VRU message indicates that the VRU is located within a specific area with respect to the V2X vehicle 100, the V2X vehicle 100 may determine that the VRU is in the V2X vehicle 100. Alternatively, the V2X vehicle 100 may receive a VRU message based on soft V2X. When the movement speed of a VRU included in the received VRU message matches or corresponds to the movement speed of the V2X vehicle 100 (or when the movement speed of the VRU included in the received VRU message matches or corresponds to the movement speed of the V2X vehicle 100 for a predetermined period of time), the V2X vehicle 100 may determine that the VRU related to the VRU message is in the V2X vehicle 100. Alternatively, when information on the location of a VRU included in a received VRU message indicates that the VRU is located within a specific area with respect to the V2X vehicle 100 and when the movement speed of the VRU matches the movement speed of the V2X vehicle 100, the V2X vehicle 100 may determine that the VRU related to the VRU message is in the boarding state (or the first state).

After determining that the VRU related to the received VRU message is on board according to the above-described method, the V2X vehicle 100 may periodically receive VRU messages related to the VRU so as to continuously monitor the state of the VRU. Since the state of the VRU may change when the V2X vehicle 100 stops (or moves at a speed less than a predetermined threshold speed), the V2X vehicle 100 may analyze whether the VRU alights therefrom when the movement speed is 0 or less than the predetermined threshold speed. If the movement speed of the VRU included in a VRU message received at or before when the V2X vehicle 100 stops is greater than the predetermined threshold speed, the V2X vehicle 100 may confirm that the VRU switches from a boarding state to a disembarking state (second state) (i.e., from the first state to the second state).

When it is detected that the state of the VRU switches from the boarding state to the disembarking state (or the second state) based on the VRU message according to soft V2X, the V2X vehicle 100 may convert the received VRU message into a virtual V2X message (BSM or PSM) based on the soft V2X VRU information collected in the VRU message. Then, the V2X vehicle 100 may transmit the virtual V2X message via a V2X module. Here, the virtual V2X message may be generated by conversion of the VRU message received after when the V2X vehicle stops Alternatively, even if a V2X device of a VRU transmits a V2X signal through direct communication as described with reference to FIG. 11(b), a surrounding soft V2X vehicle may not be able to receive any VRU signals of the conventional ITS system if the soft V2X vehicle does not have a conventional ITS module. In this case, whether the VRU is in the first or second state may be determined based on a V2X message from the V2X device of the VRU. A V2X vehicle may convert the V2X message from the VRU that switches from the first state to the second state into a virtual VRU message and then transmit the V2X messages to the soft V2X vehicle with no ITS module. Accordingly, the soft V2X vehicles may recognize that the VRU switches from the first state to the second state based on the virtual VRU message.

Figure 19:
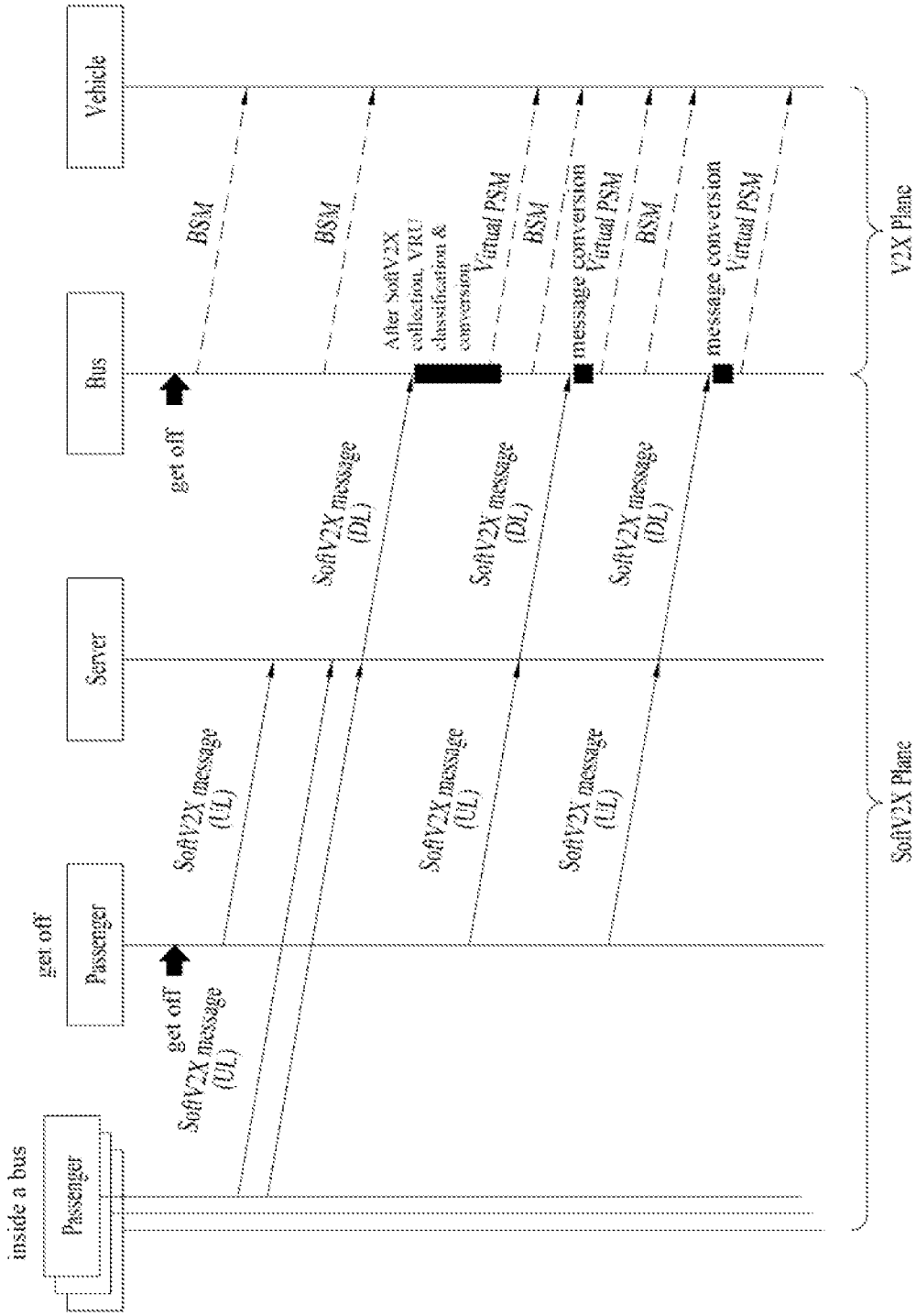
FIGS. 19 and 20 are diagrams for explaining a method for a V2X vehicle to transmit a virtual V2X message to surrounding vehicles based on a received VRU message.
Figure 20:
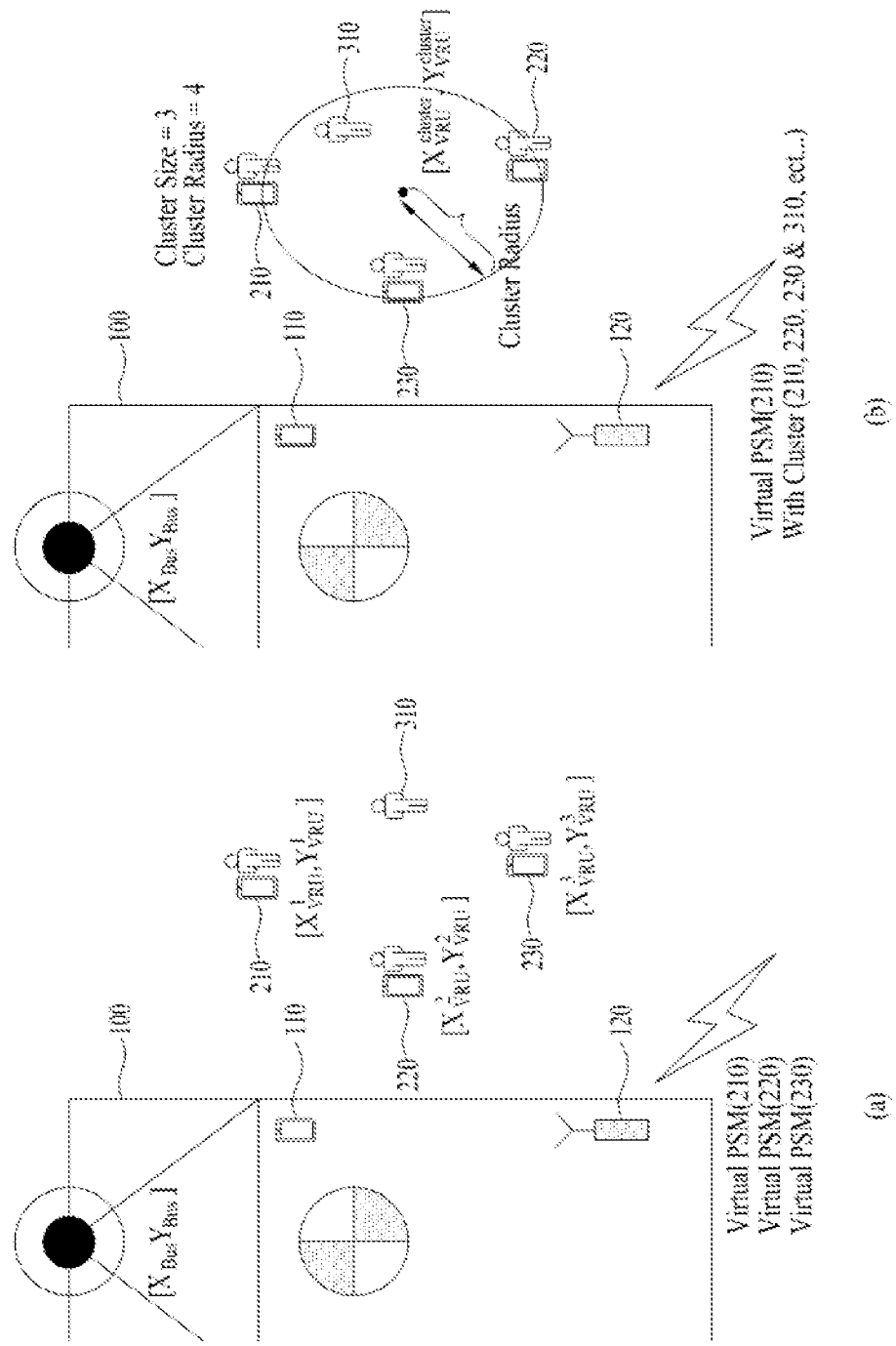

FIGS. 19 and 20 are diagrams for explaining a method for a V2X vehicle to transmit a virtual V2X message to surrounding vehicles based on a received VRU message.

Referring to FIG. 19, each passenger (or VRU) in a V2X vehicle (or bus) periodically transmits VRU information such as its own state to a soft V2X server through a soft V2X device installed in a mobile phone. In this case, the V2X vehicle may receive a VRU message including the VRU information transmitted by the VRU from the server.

The V2X vehicle may classify VRUs to be protected by comparing the VRUs with the location and state of the VRU described above and collect soft V2X information on the classified VRU to generate a virtual PSM (or virtual V2X message). That is, the V2X vehicle may not only transmit its own BSM information but also create the virtual PSM based on the locations and states of the VRUs to be protected and transmit the virtual PSM on behalf of the VRUs. The V2X vehicle may continue to receive soft V2X signals from the classified VRUs after the VRUs get off. In addition, the V2X vehicle may continuously update the virtual PSM based on the corresponding data and transmit the virtual PSM to surrounding vehicles to protect the safety of the VRUs.

In other words, when the V2X vehicle stops and passengers get off, the V2X vehicle may analyze the location of a VRU based on information on the location and/or movement speed of the VRU included in a VRU message as described with reference to FIG. 18. The V2X vehicle may determine whether there is a VRU that needs to be protected (i.e., whether there is a VRU switching from the boarding state to the disembarking state or from the first state to the second state). When there is a VRU whose state switches, the V2X vehicle may convert a VRU message related to the VRU whose state switches into a V2X message, i.e., a virtual V2X message. The V2X vehicle may transmit the virtual V2X message to surrounding vehicles. Here, the virtual V2X message may include information included in the VRU message related to soft V2X.

Referring to FIG. 20, the above-described method of generating a virtual PSM or virtual V2X message may include a method of converting a VRU message from each VRU whose state switches into a virtual V2X message and transmitting the converted virtual V2X message (FIG. 20(*a*)) and a method of converting a plurality of VRU messages from VRUs whose states switch into a single virtual V2X message and transmitting the single virtual V2X message (FIG. 20(*b*)).

First, the method according to FIG. 20 (*a*) is a method of transmitting a virtual V2X message (or virtual PSM) for each VRU. That is, a V2X device may convert each VRU message into a virtual V2X message (or virtual PSM) based on location information and state information included in the received VRU message and transmit the virtual V2X message. The method has an advantage in that the accurate state of each VRU is transmitted but also has a disadvantage in that the amount of channel resources or channel capacity increase when the number of VRUs increase.

Next, referring to FIG. 20(*b*), a V2X device may analyze information on the states of classified VRUs to generate cluster information and transmit a virtual V2X message including the cluster information. That is, the V2X device may determine a cluster area (or circle) including all locations of the classified VRUs with respect to any one of the classified VRUs and generate cluster information including the cluster area and/or the number of VRUs included in the cluster area. In this case, the V2X device may transmit one virtual V2X message including the cluster information. Here, the cluster area may be denoted by ClusterRadius, and the number of VRUs included in the cluster area may be denoted by ClusterSize. According to this method, channels may be efficiently used by transmitting one PSM, and general VRUs 310 located between soft V2X VRUs may also be protected. However, the method has a disadvantage in that it is difficult to provide accurate information on each VRU.

Alternatively, if the number of classified or state-switched VRUs is greater than or equal to a predetermined value, the V2X device may transmit a virtual V2X message according to the method described in FIG. 20(*b*). If the number of classified or state-switched VRUs is less than the predetermined value, the V2X device may transmit a virtual V2X message according to the method described in FIG. 20(*a*). Alternatively, the V2X device may measure or obtain the channel busy ratio (CBR) or channel occupancy ratio (CR) of a channel on which V2X communication is performed. If the CBR or CR is greater than or equal to a predetermined threshold, the V2X device may transmit a virtual V2X message according to method described in FIG. 20(*b*). If the CBR or CR is less than the predetermined threshold, the V2X device may transmit a virtual V2X message according to method described in FIG. 20(*a*). That is, the V2X vehicle may determine, based on the CR or CBR, whether to convert a plurality of VRU messages into a plurality of virtual V2X messages or convert a plurality of VRU messages into one virtual V2X message by integrating plurality of VRU messages.

Figure 21:
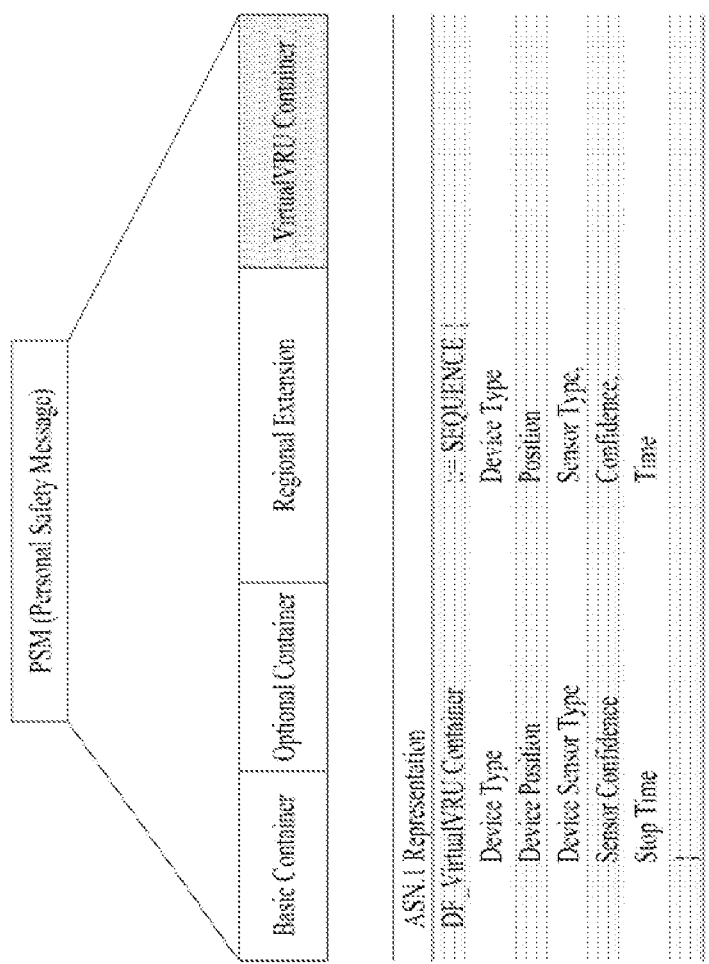
FIG. 21 is a diagram for explaining the structure of a virtual V2X message based on a received VRU message.

FIG. 21 is a diagram for explaining the structure of a virtual V2X message based on a received VRU message.

Referring to FIG. 21, a virtual V2X message (or virtual PSM) may be configured to have the same structure as that of a general V2X message (or general PSM). However, to distinguish between the virtual V2X message (or virtual PSM) and the V2X message (or PSM) including information about itself, a VirtualVRU Container field may be added to the virtual V2X message (or virtual PSM) at the end of the message. The VirtualVRU Container field may include a DeviceType field for distinguishing whether a vehicle transmitting VirtualVRU is a bus, a taxi, or a passenger car, a DevicePosition field for indicating the location of a vehicle, a DeviceSensorType field for indicating the type of a sensor used by a device to estimate the location of a VRU, a SensorConfidence field for indicating the reliability of the sensor, and/or a StopTime field indicating a time when a vehicle stops (or a time when VRUs start alighting). Accordingly, surrounding V2X vehicles may obtain the time at which VRUs starts getting off the V2X vehicle.

On the other hand, when a message is generated based on a counter, a cluster may be calculated and generated by the counter based on the number of VRUs and a difference between disembarking times. The number of VRUs is included as the number of alighting passengers in ClusterSize of a PSM, and ClusterRadius is calculated based on a passenger alighting interval time. When camera sensing is used, a VRU message capable of indicating each state may be generated as in the conventional VRU method. In both cases, a vehicle generates a virtual PSM corresponding to a VRU message, and the VirtualVRU Container field may be added to the end of the generated virtual V2X (or PSM) unlike the conventional V2X message (or PSM).

Alternatively, when a VRU message is converted into a virtual V2X message, whether the VirtualVRU Container field is added to the virtual V2X message may be determined based on the measured or acquired CBR or CR. If the measured CBR or CR is greater than or equal to a predetermined threshold level, the VirtualVRU Container field may be added to the virtual V2X message. On the other hand, if the measured CBR or CR is smaller than the predetermined threshold level, the VirtualVRU Container field may not be added to the virtual V2X message. For example, when the measured CBR or CR is greater than or equal to the predetermined threshold level, the VirtualVRU Container field may be added so that surrounding vehicles filter the V2X message.

In other words, a V2X vehicle may receive a VRU message (or first message) based on soft V2X from the network. If predetermined conditions are satisfied based on the VRU message, the V2X vehicle may convert the VRU message into a virtual V2X message such as a sidelink signal or V2X signal transmitted through the PC5 or DSRC interface and transmit the converted V2X message to surrounding vehicles. Accordingly, even if the surrounding vehicles are incapable of receiving the VRU message based on soft V2X, the surrounding vehicles may recognize adjacent VRUs or pedestrians from the virtual V2X message. Here, the virtual V2X message may be a virtual PSM, a virtual BSM, or a virtual CAM.

Specifically, the predetermined conditions may include at least one of the following conditions: when the state of a VRU switches from the first state to the second state based on VRU information included in the VRU message; when the CBR or CR is below the predetermined threshold; and when the location of a VRU is within a predetermined range from the V2X vehicle (e.g., a circle with a predetermined radius centered on the location of the V2X vehicle) based on VRU information included in the VRU message.

That is, the V2X vehicle may continuously monitor the VRU state by periodically receiving the VRU message. When the VRU state switches to the second state, the V2X vehicle may convert the VRU message into the virtual V2X message. To determine whether the VRU state is the first state, the V2X vehicle may assume that the location of the VRU is within a predetermined specific range from the V2X vehicle.

When the location of the VRU is within a predetermined range with respect to the V2X vehicle and the moving speed of the V2X vehicle is greater than or equal to a prescribed threshold, the V2X vehicle may determine whether the VRU is in the first state based on the VRU message. When it is determined that the moving speed of the VRU included in the VRU message corresponds to the moving speed of the V2X device or is within a predetermined error range from the moving speed of the V2X device, the V2X vehicle may determine that the VRU is in the first state.

The V2X vehicle periodically receives at least one VRU message from the network supporting soft V2X. If the moving speed of the V2X vehicle is zero or less than a specific threshold, the V2X vehicle may determine whether the VRU is in the second state based on the at least one VRU message. Specifically, when the moving speed of the V2X vehicle is less than the specific threshold, and the moving speed of the VRU is greater than or equal to the specific threshold, The V2X vehicle may determine that the VRU is in the second state. The V2X vehicle may determine whether the VRU switches to the second state only when it is determined that the VRU is being in the first state. The first state may be a state in which the VRU boards or gets on the V2X vehicle, and the second state may be a state in which the VRU gets off the V2X vehicle.

The V2X vehicle may receive a plurality of VRU messages and detect or determine that at least two or more VRUs switches from the first state to the second state based on the plurality of VRU messages. In this case, the V2X vehicle may convert at least two or more VRU messages from the at least two or more VRUs into one virtual V2X message. The one virtual V2X message may include cluster information on a geographic area including all VRU locations included in the at least two or more VRU messages. In addition, the one virtual V2X message may further include information on the number of VRUs related to the cluster information.

As described above, a vehicle with a V2X modem may identify a VRU alighting from which the vehicle and transmit a virtual V2X message (or virtual PSM) including information on the VRU on behalf of the VRU, thereby efficiently protecting the VRU alighting from the V2X vehicle. In addition, the vehicle may also perform retransmission to support a PSM transmitted by a low-performance VRU device, thereby safely protecting VRUs in a hazardous situation where sidewalks are adjacent to roads.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 22:
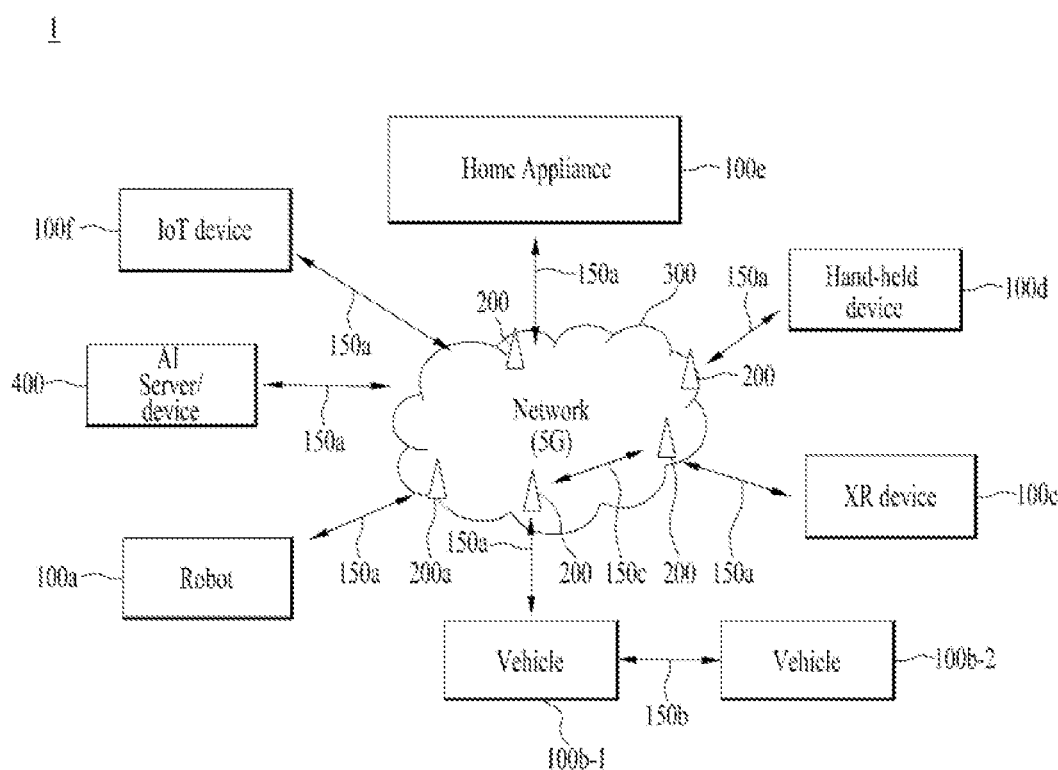
FIG. 22 illustrates a communication system applied to the present disclosure.

FIG. 22 illustrates a communication system applied to the present disclosure.

Referring to FIG. 22, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 23:
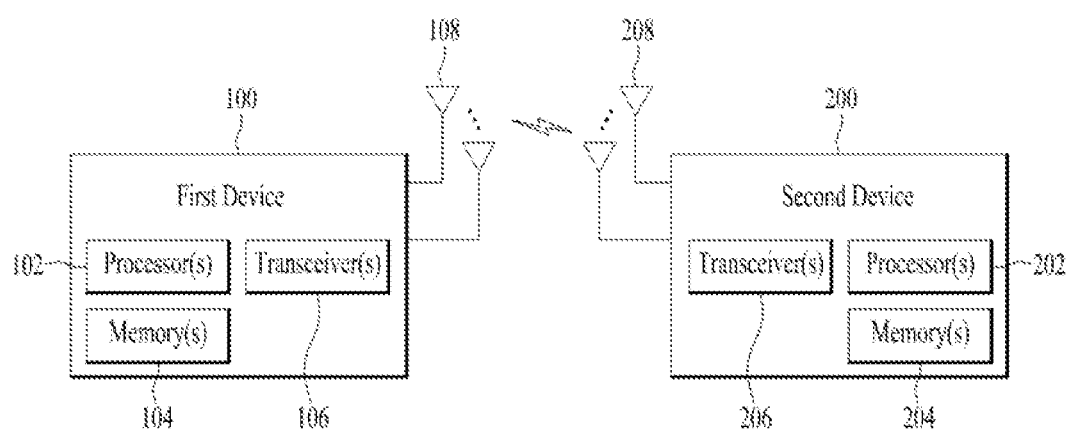
FIG. 23 illustrates wireless devices applicable to the present disclosure.

FIG. 23 illustrates a wireless device applicable to the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, a UE may include the processor(s) 102 connected to an RF transceiver and the memory(s) 104. The memory(s) 104 may include at least one program for performing the operations related to the embodiments described with reference to FIGS. 10 to 20.

The processor(s) 102 may be configured to: control the RF transceiver to periodically receive a first message including first VRU information on a first VRU from a network; determine a state of the first VRU based on the first VRU information; determine whether to convert the first message into a virtual V2X message based on the state of the first VRU; and control the RF transceiver to transmit the virtual V2X message including the first VRU information. When the state of the first VRU transitions from a first state to a second state, the processor(s) 102 may be configured to convert the first message into the virtual V2X message based on the periodically received first message. The processor(s) 102 may perform operations of transmitting a virtual V2X message, which are described with reference to FIGS. 10 to 21, based on the program included in the memory(s) 104.

Alternatively, a chipset including the processor(s) 102 and the memory(s) 104 may be configured. In this case, the chipset may include: at least one processor; and at least one memory operably connected to the at least one processor and configured to, when executed, cause the at least one processor to perform operations.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 24:
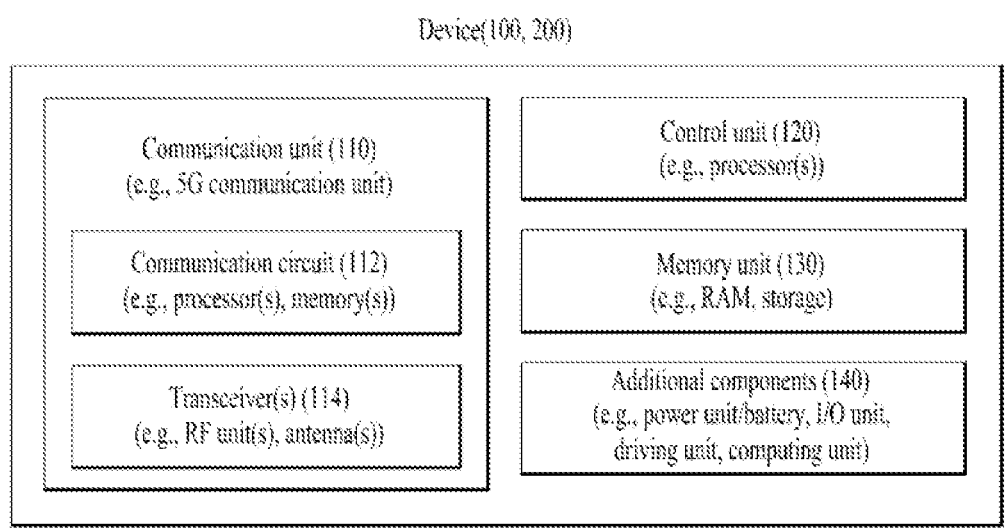
FIG. 24 illustrates another example of a wireless device to which the present disclosure is applied.

FIG. 24 illustrates another example of a wireless device applied to the present disclosure. The wireless device may be implemented in various forms according to a use-case/service (refer to FIG. 22)

Referring to FIG. 24, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 25:
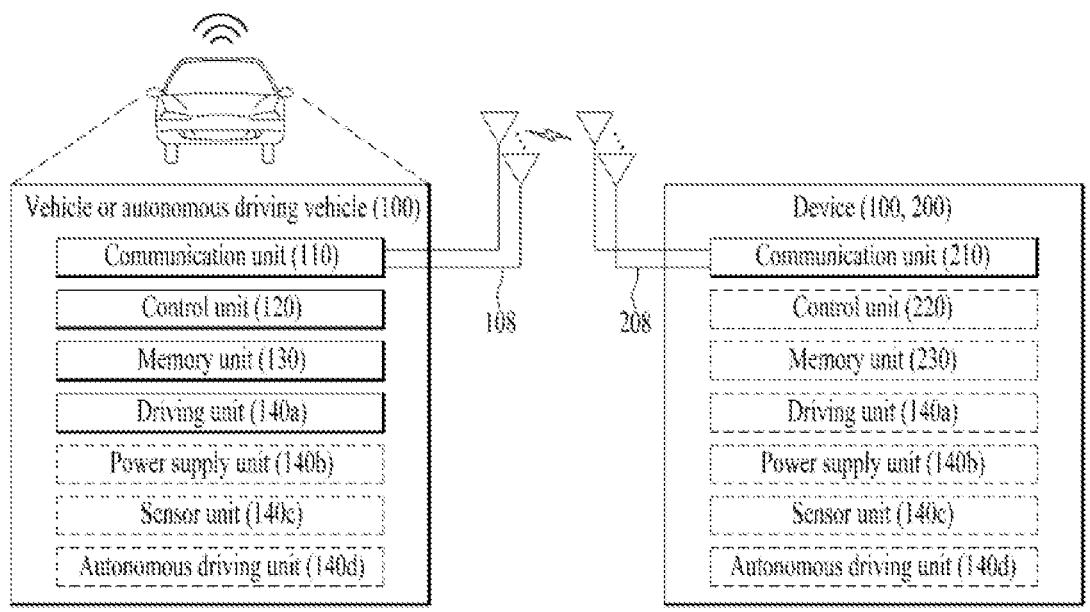
FIG. 25 illustrates a vehicle or an autonomous driving vehicle applied to the present disclosure.

Examples of Vehicles or Autonomous Vehicles to which the Present Disclosure is Applied FIG. 25 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:

1. A method by a first device comprising:
   periodically receiving a first message, which includes first vulnerable road user (VRU) information on a first VRU device, of a first message type for communication between a network and a device from the network;
   determining a state of the first VRU device as a first state based on the first VRU information;
   determining a transition of the state of the first VRU device from the first state to a second state based on a speed of the device being less than a specific threshold and a speed of the first VRU device being greater than or equal to the specific threshold;
   converting the first message of the first message type into a virtual message of a second message type for direct communication between devices based on a determination that the state of the first VRU device has transitioned from the first state to the second state; and
   transmitting the virtual message including the first VRU information to neighboring devices.

2. The method of claim 1, wherein the first state is a state in which the first VRU device is onboard the first device, and the second state is a state in which a second VRU device is disembarked from the first device.

3. The method of claim 1, wherein the first device determines whether the state of the first VRU device is the first state only based on that location information included in the first VRU information indicates that the first VRU device is within a predetermined specific range from the first device.

4. The method of claim 1, further comprising receiving a second message including second VRU information on a second VRU device from the network, wherein the first device converts the first message and the second message into a single virtual message and transmits the single virtual message based on that both the state of the first VRU device and a state of the second VRU device transition from the first state to the second state.

5. The method of claim 4, wherein the single virtual message includes cluster information on a geographic area including location information on the first VRU device and location information on the second VRU device.

6. A first device comprising:
   a radio frequency (RF) transceiver; and
   a processor connected to the RF transceiver,
   wherein the processor is configured to:
   control the RF transceiver to periodically receive a first message, which includes first vulnerable road user (VRU) information on a first VRU device, of a first message type for communication between a network and a device from the network;
   determine a state of the first VRU device as a first state based on the first VRU information;
   determining a transition of the state of the first VRU device from the first state to a second state based on a speed of the device being less than a specific threshold and a speed of the first VRU device being greater than or equal to the specific threshold;
   converting the first message of the first message type into a virtual message of a second message type for direct communication between devices based on a determination that the state of the first VRU device has transitioned from the first state to the second state; and
   control the RF transceiver to transmit the virtual message including the first VRU information to neighboring devices.

7. The first device of claim 6, wherein the first state is a state in which the first VRU device is onboard the first device, and the second state is a state in which a second VRU device is disembarked from the first device.

8. The first device of claim 6, wherein the processor is configured to determine whether the state of the first VRU device is the first state only based on that location information included in the first VRU information indicates that the first VRU device is within a predetermined specific range from the first device.

9. The first device of claim 6, wherein the processor is further configured to control the RF transceiver to receive a second message including second VRU information on a second VRU device from the network, and wherein the processor is configured to convert the first message and the second message into a single virtual message and transmit the single virtual message based on that both the state of the first VRU device and a state of the second VRU device transition from the first state to the second state.

* * * * *